(12) United States Patent
Jeong et al.

(10) Patent No.: US 11,249,871 B2
(45) Date of Patent: Feb. 15, 2022

(54) DEVICE AND METHOD FOR PROVIDING RESPONSE TO DEVICE USAGE INQUIRY

(71) Applicant: SAMSUNG ELECTRONICS CO., LTD., Suwon-si (KR)

(72) Inventors: Man-un Jeong, Suwon-si (KR); Seo-young Jo, Seoul (KR); Chang-hwan Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 533 days.

(21) Appl. No.: 16/131,738

(22) Filed: Sep. 14, 2018

(65) Prior Publication Data

US 2019/0087293 A1 Mar. 21, 2019

(30) Foreign Application Priority Data

Sep. 19, 2017 (KR) .................. 10-2017-0120511

(51) Int. Cl.
*G06F 8/70* (2018.01)
*G06F 11/22* (2006.01)
(Continued)

(52) U.S. Cl.
CPC .......... *G06F 11/2205* (2013.01); *G06F 9/453* (2018.02); *G06F 11/3438* (2013.01); *G06N 5/04* (2013.01); *H04L 51/02* (2013.01)

(58) Field of Classification Search
CPC .................................................. G06F 11/00
See application file for complete search history.

(56) References Cited

U.S. PATENT DOCUMENTS

| 8,639,638 B2 | 1/2014 | Shae et al. |
| 8,990,688 B2 | 3/2015 | Lee et al. |

(Continued)

FOREIGN PATENT DOCUMENTS

| EP | 1 522 920 A2 | 4/2005 |
| KR | 10-2005-0025288 A | 3/2005 |
| KR | 10-2016-0058523 A | 5/2016 |

OTHER PUBLICATIONS

International Search Report and Written Opinion (PCT/ISA/210 and PCT/ISA/237), dated Jan. 2, 2019 by International Searching Authority in International Application No. PCT/KR2018/010748.
(Continued)

*Primary Examiner* — Di Xiao
(74) *Attorney, Agent, or Firm* — Sughrue Mion, PLLC

(57) ABSTRACT

Provided are a device for providing a response operation corresponding to a device usage inquiry and a method of controlling the device. The method of controlling a device for providing a response operation corresponding to a device usage inquiry may include: receiving a user input corresponding to the device usage inquiry; classifying the device usage inquiry by analyzing the received user input corresponding to the device usage inquiry; extracting operation scenario information corresponding to a result of the classifying the device usage inquiry; and executing preset response operations of the device based on the operation scenario information, wherein the classifying includes classifying the device usage inquiry by inputting the user input of the device usage inquiry to a learning model that is a pre-generated.

15 Claims, 47 Drawing Sheets

(51) Int. Cl.
    *G06F 11/34*     (2006.01)
    *G06F 9/451*     (2018.01)
    *H04L 51/02*     (2022.01)
    *G06N 5/04*     (2006.01)

(56) References Cited

U.S. PATENT DOCUMENTS

| | | |
|---|---|---|
| 9,098,826 B2 | 8/2015 | Jung et al. |
| 2002/0023144 A1 | 2/2002 | Linyard et al. |
| 2009/0265629 A1 | 10/2009 | Dantwala |
| 2015/0026146 A1 | 1/2015 | Mance |
| 2015/0099494 A1* | 4/2015 | Liu ................... H04W 64/00 455/414.1 |
| 2016/0019805 A1 | 1/2016 | Allen et al. |
| 2017/0177715 A1 | 6/2017 | Chang et al. |
| 2018/0060225 A1* | 3/2018 | Tao .................... G06F 11/3612 |
| 2018/0260760 A1* | 9/2018 | Srivastava ....... G06Q 10/06313 |
| 2020/0152199 A1 | 5/2020 | Chae |
| 2020/0320989 A1* | 10/2020 | Watanabe ............... G06F 9/453 |

OTHER PUBLICATIONS

Communication dated Jul. 9, 2020 issued by the European Intellectual Property Office in counterpart European Application No. 18859583.9.

Communication dated Sep. 30, 2021 by the Korean Intellectual Property Office in counterpart English Korean Patent Application No. 10-2017-0120511 English translation.

* cited by examiner

FIG. 6

| FIRST CATEGORY | SECOND CATEGORY | THIRD CATEGORY |
|---|---|---|
| Inquiry about method using device | Inquiry about function executed by device | Make call, send text, transfer file |
| | | Take photo/video |
| | | Watch photo/video |
| | | Listen to music |
| | | Do search |
| | | Connect to peripheral device |
| | | Send money |
| | ⋮ | ⋮ |
| Inquiry about method of solving trouble occurring in device | Trouble occurring in function executed by device | Make call, send text, transfer file |
| | | Take photo/video |
| | | Watch photo/video |
| | | Listen to music |
| | | Do search |
| | | Connect to peripheral device |
| | | Send money |
| | ⋮ | ⋮ |
| | Trouble occurring in hardware module of device | Battery |
| | | Display |
| | | Phone |
| | | Internet |
| | | Bluetooth |
| | | Volume controller |
| | | Camera |
| | | Biometric sensor |
| | ⋮ | ⋮ |

DEVICE AND METHOD FOR PROVIDING RESPONSE TO DEVICE USAGE INQUIRY

CROSS-REFERENCE TO RELATED APPLICATION(S)

This application is based on and claims priority under 35 U.S.C. § 119 to Korean Patent Application No. 10-2017-0120511, filed on Sep. 19, 2017, in the Korean Intellectual Property Office, the disclosure of which is incorporated by reference herein in its entirety.

BACKGROUND

1. Field

The disclosure relates to devices and methods for providing responses to device usage inquiries of users.

2. Description of Related Art

An artificial intelligence (AI) system is a computer system configured to realize human-level intelligence and gets smarter by training itself and making determinations spontaneously, unlike an existing rule-based smart system. Because a recognition rate of the AI system improves and the AI system more accurately understands a user's taste as it is increasingly used, the rule-based smart system is being gradually replaced by a deep learning-based AI system.

AI technology includes machine learning (e.g., deep learning) and element technologies using the machine learning.

Machine learning is an algorithm technology that self-classifies and learns characteristics of input data, and element technologies are technologies using a machine learning algorithm such as deep learning and include technical fields such as linguistic understanding, visual understanding, inference/prediction, knowledge representation, and motion control.

AI technology is applied to various fields. For example, linguistic understanding is a technology for recognizing and applying/processing human languages/characters and includes natural language processing, machine translation, dialog systems, questions and answering, and voice recognition/synthesis. Visual understanding is a technology for recognizing and processing objects like performed by a human visual system and includes object recognition, object tracking, image searching, person recognition, scene understanding, spatial understanding, and image enhancement. Inference/prediction is a technology for judging information and logically inferring and predicting the same and includes knowledge/probability-based reasoning, optimization prediction, preference-based planning, and recommendation. Knowledge representation is an automation technology for incorporating human experience information into knowledge data and includes knowledge building (e.g., data generation/classification), and knowledge management (e.g., data utilization). Motion control is a technology for controlling self-driving of autonomous vehicles and the motion of robots and includes movement control (e.g., navigation, collision avoidance, or driving), and manipulation control (e.g., behavior control).

As multimedia technology and network technology have been developed, users may use various services by using devices. However, there is a case in which the user does not know a function provided by a device and thus may not use the function provided by the device. Also, as the user uses the device, various kinds of trouble, which the user may be unable to solve, may arise.

Accordingly, there is demand for technology for receiving a user input making a device usage inquiry and for providing a response operation corresponding to the device usage inquiry to meet the user's intention with respect to the user input.

SUMMARY

Provided is a response operation corresponding to a user input of a device usage inquiry.

Provided is a response operation corresponding to an inquiry about a method of using a device.

Provided is a response operation corresponding to an inquiry about trouble occurring in a device.

Additional aspects will be set forth in part in the description which follows and, in part, will be apparent from the description, or may be learned by practice of the presented embodiments.

In accordance with an aspect of the disclosure, a device includes: a memory configured to store at least one program; a user input interface configured to receive a user input corresponding to a device usage inquiry; and at least one processor configured to provide a response operation corresponding to the device usage inquiry by executing the at least one program, wherein the at least one program includes instructions for: classifying the device usage inquiry by analyzing the received user input corresponding to the device usage inquiry; extracting operation scenario information corresponding to a result of the classifying the device usage inquiry; and executing detailed response operations of the device based on the operation scenario information, wherein the classifying includes classifying the device usage inquiry by inputting the user input of the device usage inquiry to a learning model that is pre-generated.

The extracting of the operation scenario information may include: extracting specification information of the device and extracting state information of the device; and extracting the operation scenario information based on the extracted specification information of the device and the extracted state information of the device.

The extracted operation scenario information may include information about an execution order of the detailed response operations, and wherein the executing of the detailed response operations of the device may include executing the detailed response operations according to the execution order.

The device usage inquiry may be classified into a category related to trouble occurring in the device, wherein the extracted operation scenario information may include detailed response operations for trouble shooting of the device, wherein the executing of the detailed response operations of the device may include: determining a recommendation operation for the trouble shooting of the device; and outputting a suggestion message for suggesting the determined recommendation operation.

The executing of the detailed response operations of the device may include: outputting a confirmation message for checking whether the trouble occurring in the device has been solved by executing the recommendation operation; receiving a user input with respect to the confirmation message; when the user input with respect to the confirmation message is received, determining an additional recommendation operation for trouble shooting; and outputting an additional suggestion message for suggesting the determined additional recommendation operation.

The device usage inquiry may be classified into a category related to trouble occurring in the device, wherein the extracted operation scenario information may include detailed response operations for trouble shooting of the device, wherein the executing of the detailed response operations of the device may include: determining a recommendation operation for the trouble shooting of the device; and executing the determined recommendation operation irrespective of whether a user input for executing the determined recommendation operation is received.

The executing of the detailed response operations of the device may include: outputting a confirmation message for checking whether the trouble occurring in the device has been solved by the executing of the recommendation operation; receiving a user input with respect to the confirmation message; when the user input with respect to the confirmation message is received, determining an additional recommendation operation for trouble shooting; and executing the determined additional recommendation operation.

The device usage inquiry may be classified into a category related to trouble occurring in the device, wherein the extracted operation scenario information may include detailed response operations for trouble shooting of the device, wherein the executing of the detailed response operations of the device may include: determining a recommendation operation for the trouble shooting of the device; and outputting an operation guide of the device for receiving a user input to execute the determined recommendation operation.

The executing of the detailed response operations of the device may include: outputting a confirmation message for checking whether the trouble occurring in the device has been solved by executing the recommendation operation; receiving a user input with respect to the confirmation message; when the user input with respect to the confirmation message is received, determining an additional recommendation operation for trouble shooting; and outputting an additional operation guide of the device for receiving a user input to execute the determined additional recommendation operation.

The device usage inquiry may be classified into a category related to trouble occurring in the device, wherein the executing of the detailed response operations of the device may include: outputting a confirmation message for checking whether the trouble occurring in the device has been solved by the executing the detailed response operations of the device; receiving a user input with respect to the confirmation message; re-classifying the device usage inquiry based on the user input with respect to the confirmation message; re-extracting the operation scenario information corresponding to a result of the re-classifying the device usage inquiry; and executing the detailed response operations of the device based on the re-extracted operation scenario information.

In accordance with another aspect of the disclosure, a method of controlling a device for providing a response operation corresponding to a device usage inquiry includes: receiving a user input corresponding to the device usage inquiry; classifying the device usage inquiry by analyzing the received user input corresponding to the device usage inquiry; extracting operation scenario information corresponding to a result of the classifying the device usage inquiry; and executing detailed response operations of the device based on the operation scenario information, wherein the classifying includes classifying the device usage inquiry by inputting the user input of the device usage inquiry to a learning model that is pre-generated.

The extracting of the operation scenario information may include: extracting specification information of the device and extracting state information of the device; and extracting the operation scenario information based on the extracted specification information of the device and the extracted state information of the device.

The extracted operation scenario information may include information about an execution order of the detailed response operations, and wherein the executing of the detailed response operations of the device may include executing the detailed response operations according to the execution order.

The device usage inquiry may be classified into a category related to trouble occurring in the device, wherein the extracted operation scenario information may include detailed response operations for trouble shooting of the device, wherein the executing of the detailed response operations of the device may include: determining a recommendation operation for the trouble shooting of the device; and outputting a suggestion message for suggesting the determined recommendation operation.

The executing of the detailed response operations of the device may include: outputting a confirmation message for checking whether the trouble occurring in the device has been solved by executing the recommendation operation; receiving a user input with respect to the confirmation message; when the user input with respect to the confirmation message is received, determining an additional recommendation operation for trouble shooting; and outputting an additional suggestion message for suggesting the determined additional recommendation operation.

the device usage inquiry may be classified into a category related to trouble occurring in the device, wherein the extracted operation scenario information may include detailed response operations for trouble shooting of the device, wherein the executing of the detailed response operations of the device may include: determining a recommendation operation for the trouble shooting of the device; and executing the determined recommendation operation irrespective of whether a user input for executing the determined recommendation operation is received.

The executing of the detailed response operations of the device may include: outputting a confirmation message for checking whether the trouble occurring in the device has been solved by the executing of the recommendation operation; receiving a user input with respect to the confirmation message; when the user input with respect to the confirmation message is received, determining an additional recommendation operation for trouble shooting; and executing the determined additional recommendation operation.

The device usage inquiry may be classified into a category related to trouble occurring in the device, wherein the extracted operation scenario information may include detailed response operations for trouble shooting of the device, wherein the executing of the detailed response operations of the device may include: determining a recommendation operation for the trouble shooting of the device; and outputting an operation guide of the device for receiving a user input to execute the determined recommendation operation.

The executing of the detailed response operations of the device may include: outputting a confirmation message for checking whether the trouble occurring in the device has been solved by executing the recommendation operation; receiving a user input with respect to the confirmation message; when the user input with respect to the confirmation message is received, determining an additional recommendation operation for trouble shooting; and outputting an additional operation guide of the device for receiving a user input to execute the determined additional recommendation operation.

The device usage inquiry may be classified into a category related to trouble occurring in the device, wherein the executing of the detailed response operations of the device may include: outputting a confirmation message for checking whether the trouble occurring in the device has been solved by the executing the detailed response operations of the device; receiving a user input with respect to the confirmation message; re-classifying the device usage inquiry based on the user input with respect to the confirmation message; re-extracting the operation scenario information corresponding to a result of the re-classifying the device usage inquiry; and executing the detailed response operations of the device based on the re-extracted operation scenario information.

In accordance with another aspect of the disclosure, a non-transitory computer-readable recording medium has recorded thereon a program for causing a processor to perform a method of controlling a device for providing a response operation corresponding to a device usage inquiry, the method including: receiving a user input corresponding to the device usage inquiry; classifying the device usage inquiry by analyzing the received user input corresponding to the device usage inquiry; extracting operation scenario information corresponding to a result of the classifying the device usage inquiry; and executing detailed response operations of the device based on the operation scenario information, wherein the classifying includes classifying the device usage inquiry by inputting the user input of the device usage inquiry to a learning model that is pre-generated.

The extracting of the operation scenario information may include: extracting specification information of the device and extracting state information of the device; and extracting the operation scenario information based on the extracted specification information of the device and the extracted state information of the device.

The extracted operation scenario information may include information about an execution order of the detailed response operations, and wherein the executing of the detailed response operations of the device may include executing the detailed response operations according to the execution order.

The device usage inquiry may be classified into a category related to trouble occurring in the device, wherein the extracted operation scenario information may include detailed response operations for trouble shooting of the device, wherein the executing of the detailed response operations of the device may include: determining a recommendation operation for the trouble shooting of the device; and outputting a suggestion message for suggesting the determined recommendation operation.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a table illustrating categories of device usage inquiries, according to one or more embodiments;

DETAILED DESCRIPTION

Figure 1:
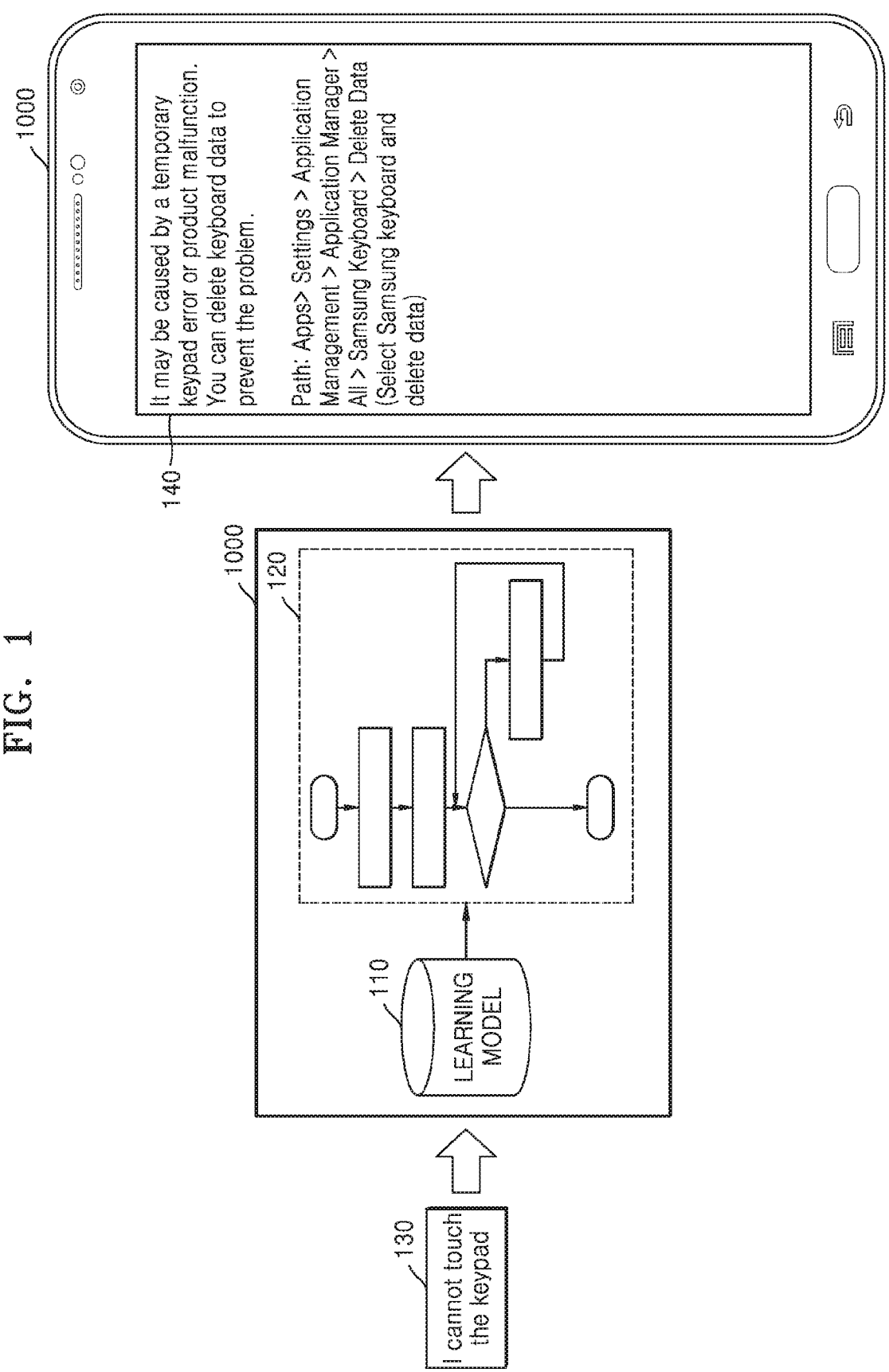
FIG. 1 is a diagram illustrating an example in which a device provides a response operation corresponding to a device usage inquiry, according to one or more embodiments.

The present disclosure will now be described more fully with reference to the accompanying drawings for one of ordinary skill in the art to be able to perform the present disclosure without any difficulty. The disclosure may, however, be embodied in many different forms and should not be construed as being limited to the embodiments set forth herein. Also, parts in the drawings unrelated to the detailed description are omitted to ensure clarity of the present disclosure. Like reference numerals in the drawings denote like elements.

The present disclosure may be described in terms of functional block components and various processing steps. Such functional blocks may be realized by any number of hardware and/or software components configured to perform specified functions. For example, the functional blocks of the present disclosure may be realized by one or more microprocessors, or circuit components for performing predetermined functions. Also, for example, the functional blocks of the present disclosure may be implemented with any programming or scripting language. The functional blocks may be implemented in algorithms that are executed on one or more processors. Furthermore, the present disclosure could employ any number of conventional techniques for electronics configuration, signal processing, and/or data processing. The words "mechanism", "element", "means", and "configuration" are used broadly and are not limited to mechanical or physical embodiments.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Furthermore, connecting lines, or connectors shown in the various figures presented are intended to represent example functional relationships and/or physical or logical couplings between the various elements. It should be noted that many alternative or additional functional relationships, physical connections, or logical connections may be present in a practical device.

It will be understood that although the terms "first", "second", etc. may be used herein to describe various elements, these elements should not be limited by these terms. These terms are only used to distinguish one element from another.

As used herein, the term "and/or" includes any and all combinations of one or more of the associated listed items. Expressions such as "at least one of," when preceding a list of elements, modify the entire list of elements and do not modify the individual elements of the list.

The present disclosure will now be described more fully with reference to the accompanying drawings, in which embodiments of the disclosure are shown.

FIG. 1 is a diagram illustrating an example in which a device 1000 provides a response operation corresponding to a device usage inquiry, according to one or more embodiments.

Referring to FIG. 1, the device 1000 may receive a user input 130 for a device usage inquiry from a user. For example, a user may input that he cannot touch the keypad. The device 1000 may provide a response operation 140 that meets the user's intention related to the user usage inquiry by analyzing the received user input 130 for the device usage inquiry. For example, the device may indicate to the user that there is a temporary keypad error or product malfunction, and provide a way to correct the error.

According to an embodiment, the device 1000 may analyze the received user input 130 for the device usage inquiry, and may classify the device usage inquiry to provide a response that meets the user's intention related to the device usage inquiry.

According to an embodiment, the device 1000 may classify the device usage inquiry by inputting the user input 130 to a learning model 110 that is pre-generated. For example, the device 1000 may determine whether the device usage inquiry corresponds to an inquiry about a method of using the device usage inquiry or an inquiry about a method of solving trouble occurring in the device 1000.

According to an embodiment, the device 1000 may extract operation scenario information 120 corresponding to a classification result of the device usage inquiry. The operation scenario information 120 refers to information about a scenario for sequentially providing detailed response operations of the device 1000 related to the device usage inquiry.

According to an embodiment, the device 1000 may provide the response operation 140 of the device 1000 based on the operation scenario information 120 corresponding to the classification result of the device usage inquiry. The device 1000 may provide the response operation 140 of the device 1000 based on information about the detailed response operations included in the operation scenario information 120 and order information about an execution order of the detailed response operations.

According to an embodiment, the response operation 140 of the device 1000 may include, but is not limited to, an operation of providing a reply corresponding to the device usage inquiry, an operation by which the device 1000 performs a function, and an operation by which the device 1000 provides an operation guide to the user to execute a function.

Examples of the device 1000 may be, but are not limited to, a smartphone, a tablet personal computer (PC), a PC, a smart television (TV), a mobile phone, a personal digital assistant (PDA), a laptop, a media player, a micro-server, a global positioning system (GPS) device, an electronic book terminal, a digital broadcast terminal, a navigation system, a kiosk, an MP3 player, a digital camera, a home appliance, and any of other mobile or non-mobile computing devices. Also, examples of the device 1000 may include a wearable device such as a watch, glasses, a hair band, or a ring having a communication function and a data processing function. However, the present disclosure is not limited thereto, and the device 1000 may be any type of device that may receive a user input of a device usage inquiry of the user and may provide a response operation corresponding to the device usage inquiry to the user.

Also, the device 1000 may communicate with a server 2000 and another device through a network to provide the response operation corresponding to the device usage inquiry to the user. In this case, examples of the network may include a local area network (LAN), a wide area network (WAN), a value-added network (VAN), a mobile radio communication network, a satellite communication network, and a combination thereof. The network is a data communication network for smooth communication between network components in a broad sense, and examples of the network may include a wired Internet, a wireless Internet, and a mobile wireless communication network. Examples of wireless communication may be, but are not limited to, Wi-Fi, Bluetooth, Bluetooth low energy, Zigbee, Wi-Fi Direct (WFD), ultra-wideband (UWB), infra-red data association (IrDA), and near-field communication (NFC).

Figure 2:
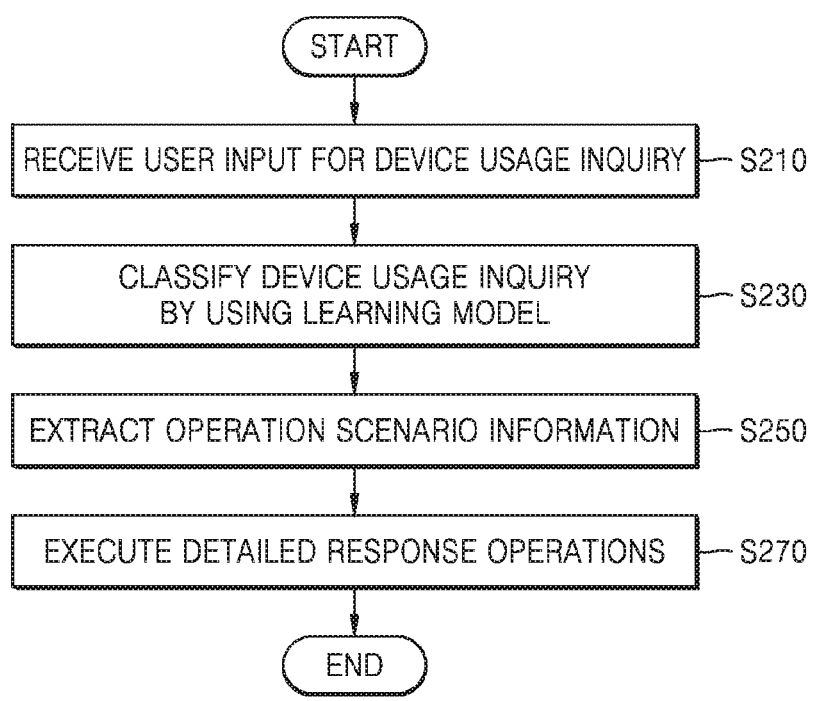
FIG. 2 is a flowchart of a method by which the device provides a response operation corresponding to a device usage inquiry, according to one or more embodiments.

FIG. 2 is a flowchart of a method by which the device 1000 provides a response operation corresponding to a device usage inquiry, according to one or more embodiments.

In operation S210, the device 1000 may receive the user input 130 for a device usage inquiry.

According to an embodiment, the device 1000 may receive, but is not limited to, text, a voice, an image, a video, or a combination thereof as the user input 130 for the device usage inquiry.

According to an embodiment, the device usage inquiry may include, but is not limited to, an inquiry about a method of using the device 1000 and an inquiry about a method of solving trouble occurring in the device 1000.

In operation S230, the device 1000 may classify the device usage inquiry by using the learning model 110.

According to an embodiment, the device 1000 may classify the device usage inquiry by inputting the received user input 130 for the device usage inquiry to the learning model 110. For example, the device 1000 may classify the device usage inquiry according to whether the device usage inquiry is an inquiry about a method of using the device 1000 or an inquiry about a method of solving trouble occurring in the device 1000 by inputting the user input to the learning model 110 that is pre-generated.

Also, the device 1000 may classify the device usage inquiry according to information indicating that the device usage inquiry corresponds to an inquiry about a method of using a function from among functions executed by the device 1000. The device 1000 may classify the device usage inquiry according to information indicating that the device usage inquiry corresponds to trouble occurring in a function from among the functions executed by the device 1000. The device 1000 may classify the device usage inquiry according to information indicating that the device usage inquiry corresponds to trouble occurring in a module from among hardware modules of the device 1000.

According to an embodiment, the device 1000 may classify the device usage inquiry by inputting, to the learning model 110, any one or any combination of specification information of the device 1000, state information of the device 1000, ambient environment information of the device 1000, state information of a user who uses the device 1000, and device usage history information of the user that are obtained.

The specification information of the device 1000 that refers to information indicating a specification of the device 1000 may include, but is not limited to, information about a model name of the device 1000, a product name, a processor, a display, a camera, a memory, a communication network, a measurable external environment type, and an operating system (OS) of the device 1000.

The state information of the device 1000 may include, but is not limited to, information about a mode of the device 1000 (e.g., a sound mode, a vibration mode, a silent mode, a power saving mode, a cutoff mode, a multi-window mode, or an automatic rotation mode), position information of the device 1000, time information, activation information of a communication module (e.g., Wi-Fi ON, Bluetooth OFF, GPS ON, or NFC ON), network connection state information of the device 1000, and information about an application executed by the device 1000 (e.g., application identification information, an application type, an application usage time, or an application usage cycle).

The ambient environment information of the device 1000 that refers to environment information within a predetermined radius from the device 1000 may include, but is not limited to, weather information, temperature information, humidity information, illuminance information, noise information, and sound information.

The state information of the user that refers to information about the user's movement or life pattern may include, but is not limited to, information about the user's walking state, exercising state, driving state, sleep state, and mood state.

The device usage history information of the user that refers to information about events in which the user uses the device 1000 may include, but is not limited to, information about execution of applications, functions executed by the applications, the user's phone conversations, and the user's text messages.

In operation S250, the device 1000 may extract operation scenario information to provide a response operation corresponding to the device usage inquiry. The device 1000 may extract the operation scenario information for providing a preset response operation based on a classification result of the device usage inquiry.

According to an embodiment, a plurality of pieces of operation scenario information may be set to respectively correspond to a plurality of classification results. The device 1000 may extract the operation scenario information 120 corresponding to a classification result of the device usage inquiry input by the user, from among the plurality of pieces of operation scenario information respectively corresponding to the various classification results.

According to an embodiment, in order for the device 1000 to extract the operation scenario information 120 corresponding to the classification result, any one or any combination of the specification information of the device 1000, the state information of the device 1000, the state information of the user who uses the device 1000, and the device usage history information of the user that was previously obtained may be used.

In operation S270, the device 1000 may execute detailed response operations corresponding to the received user input of the device usage inquiry.

According to an embodiment, the device 1000 may execute the detailed response operations corresponding to the user input of the device usage inquiry based on the extracted operation scenario information 120. The device 1000 may execute the detailed response operations based on information about detailed response operations included in the extracted operation scenario information 120 and information an execution order of the detailed response operations.

According to an embodiment, the detailed response operations may include, but are not limited to, a function of outputting a reply message corresponding to the device usage inquiry, a function of outputting a confirmation message for checking whether trouble has been solved, a function of receiving a user input for the output reply message, and a function of receiving a user input for the output confirmation message.

According to an embodiment, the detailed response operations may include, but are not limited to, a function of obtaining any one or any combination of the specification information of the device 1000, the state information of the device 1000, the ambient environment information of the device 1000, the state information of the user who uses the device 1000, and the device usage history information of the user.

According to an embodiment, the detailed response operations may include, but are not limited to, a function of comparing the specification information of the device 1000, the state information of the device 1000, the ambient environment information of the device 1000, the state information of the user who uses the device 1000, and the device usage history information of the user that are obtained with the specification information of the device 1000, the state information of the device 1000, the ambient environment information of the device 1000, the state information of the user who uses the device 1000, and the device usage history information of the user that are included in the extracted operation scenario information 120.

According to an embodiment, as a detailed response operation, the device 1000 may provide, but is not limited to, text, a voice, an image, a video, or a combination thereof as a reply. For example, the device 1000 may output a reply message corresponding to the device usage inquiry as text, a voice, or a combination thereof. As another example, the device 1000 may output, as an image, a part of a user manual in which a reply corresponding to the device usage inquiry is written. Specifically, the device 1000 may output, as an image, a part of a user manual in which a method of using a phone application is written. As another example, the device 1000 may output a reply corresponding to the device usage inquiry as a video. Specifically, the device 1000 may output a video about a method of using a phone application.

According to an embodiment, as a detailed response operation to an inquiry about a method of using a function executed by the device 1000, the device 1000 may execute the function. For example, the device 1000 may automatically execute a function such as a function of making a call, a function of sending text, a function of transferring a file, a function of taking a photo and a video, a function of watching a photo and a video, a function of listening to music, a function of adjusting a volume, a function of doing a search, a function of connecting to a peripheral device, and/or a function of sending money, which is a function executed by the device 1000.

According to an embodiment, as a detailed response operation to an inquiry about trouble occurring in a function executed by the device 1000, the device 1000 may execute a function for trouble shooting. For example, the device 1000 may end and re-execute a process related to a function having trouble. Specifically, the device 1000 may end a process related to a function of executing a phone application, and may re-execute the phone application.

According to an embodiment, as a detailed response operation to an inquiry about trouble occurring in a hardware module of the device 1000, the device 1000 may execute a function for trouble shooting. For example, the device 1000 may execute a function for solving trouble occurring in a hardware module of the device 1000 such as a battery, a display, a phone, a communication module such as the Internet or Bluetooth, a volume controller, a camera, or a biometric sensor. Specifically, the device 1000 may execute a function of ending an application that is currently operating in a background in response to a user input of a device usage inquiry saying "The battery does not last long". The device 1000 may execute a function of stopping automatic execution of an application that has no history of being used for a long time, a function of reducing a brightness of a display, a function of changing a resolution of the display to a low resolution, a function of limiting a processing speed of a processor, or a function of limiting the use of a network in the background.

According to an embodiment, as a detailed response operation, the device 1000 may provide an operation guide to the user for the device usage inquiry. For example, as a detailed response operation to an inquiry about a method of using a function executed by the device 1000, the device 1000 may provide an operation guide that helps the user to execute the function. As another example, as a detailed response operation to an inquiry about trouble occurring in a function executed by the device 1000, the device 1000 may provide an operation guide that helps the user to execute a function for trouble shooting. As another example, as a detailed response operation to an inquiry about trouble occurring in a hardware module of the device 1000, the device 1000 may provide an operation guide that helps the user to execute a function for trouble shooting.

According to an embodiment, the device 1000 may sequentially execute detailed response operations corresponding to the user input of the device usage inquiry based on information about the execution order of the detailed response operations included in the extracted operation scenario information 120.

According to an embodiment, the device 1000 may output a confirmation message for checking whether trouble occurring in the device 1000 has been solved. The device 1000 may determine and execute an additional recommendation operation for trouble shooting based on a user input with respect to the confirmation message. As a detailed response operation corresponding to the additional recommendation operation, the device 1000 may execute a detailed response operation that is not executed yet based on the information about the execution order of the detailed response operations included in the operation scenario information 120.

According to an embodiment, the device 1000 may output a confirmation message for checking whether trouble occurring in the device 1000 has been solved. The device 1000 may re-classify the device usage inquiry based on a user input for the confirmation message.

Figure 3:
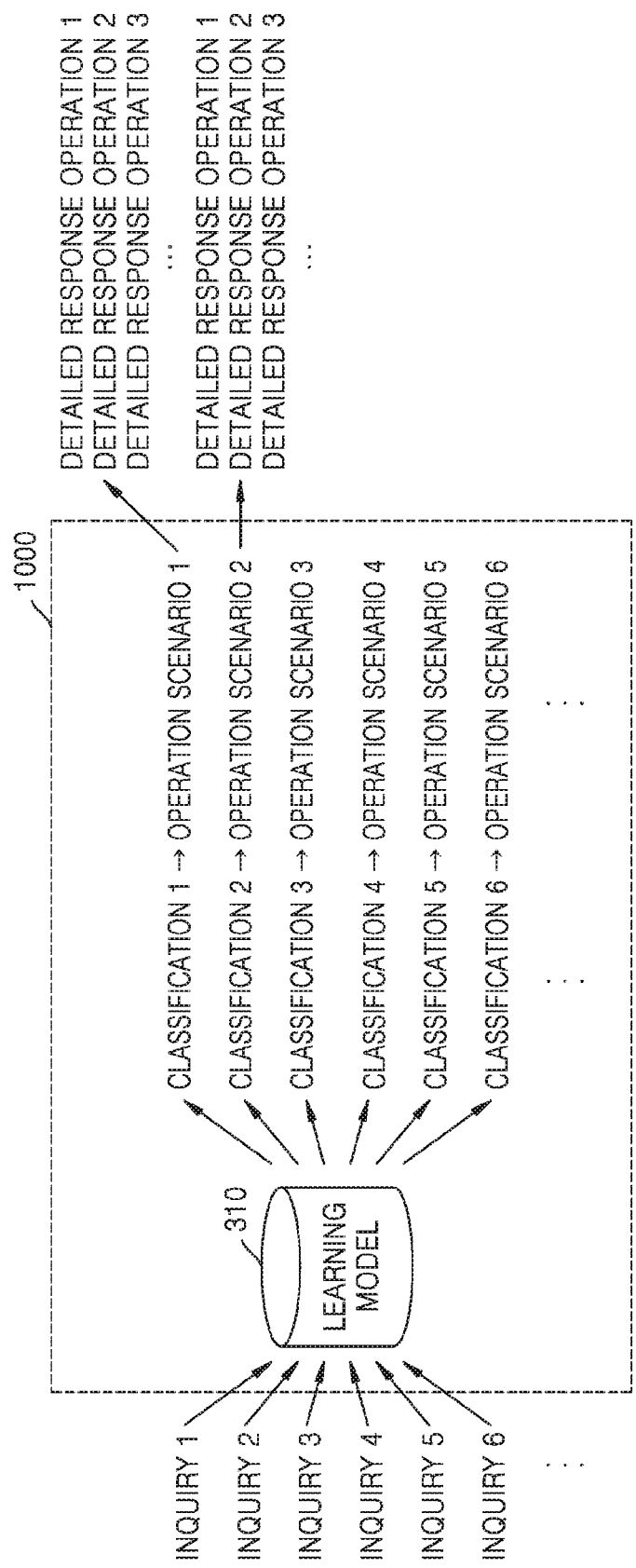
FIG. 3 is a diagram illustrating an example in which the device learns through a learning model to provide a device usage inquiry and a response operation, according to one or more embodiments.

FIG. 3 is a diagram illustrating an example in which the device 1000 learns through a learning model to provide a device usage inquiry and a response operation, according to one or more embodiments.

Referring to FIG. 3, the device 1000 may perform learning of classifying a device usage inquiry by inputting, to a learning model 310, a plurality of user inputs for a plurality of device usage inquiries and classification results of the plurality of corresponding device usage inquiries as learning data.

According to an embodiment, the device 1000 may perform learning of classifying the device usage inquiry by inputting, to the learning model 310, any one or any combination of specification information of the device 1000, state information of the device 1000, ambient environment information of the device 1000, state information of a user who uses the device 1000, and device usage history information of the user as learning data.

According to an embodiment, how the device usage inquiry received as the user input is classified may be determined depending on learning according to a preset standard. For example, supervised learning, unsupervised learning, and reinforcement learning may be used to classify the device usage inquiry. How the device usage inquiry received as the user input is classified may be learned according to a deep neural network technology.

According to an embodiment, the device 1000 may classify the device usage inquiries corresponding to the plurality of user inputs into a plurality of hierarchical categories based on the learning data input to the learning model 310.

According to an embodiment, the device 1000 may generate a classification model including information about the plurality of user inputs and a plurality of category classification results. The device 1000 may apply the generated classification model to the learning model 310. The device 1000 may classify the device usage inquiry received as the user input based on the learning model 310 to which the generated classification model is applied.

According to an embodiment, the device 1000 may refine the generated classification model through additional learning. For example, the device 1000 may output a confirmation message for a response operation of the device 1000 and may refine the classification model based on a user input with respect to the confirmation message.

Figure 4:
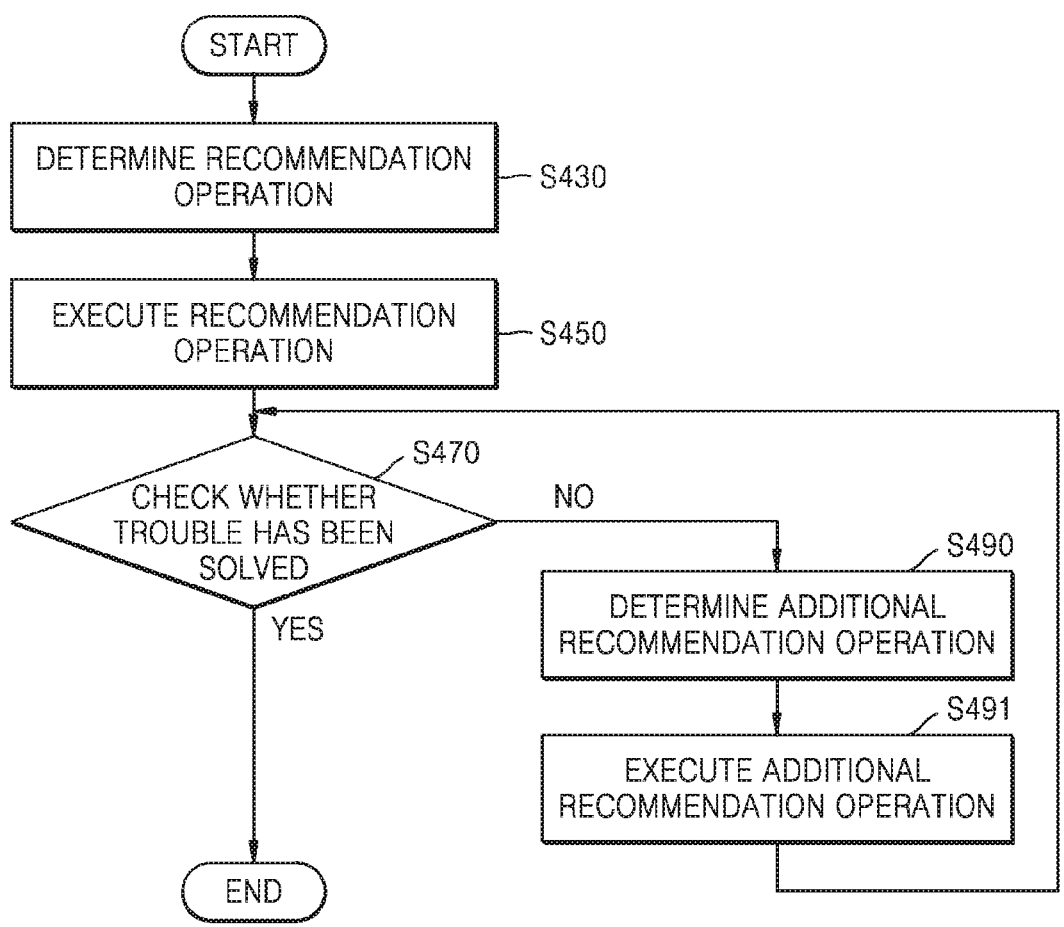
FIG. 4 is a flowchart of a method by which the device executes an additional recommendation operation according to whether trouble has been solved, according to one or more embodiments.

FIG. 4 is a flowchart of a method by which the device 1000 executes an additional recommendation operation according to whether trouble has been solved, according to one or more embodiments.

In operation S430, the device 1000 may determine a recommendation operation for solving trouble occurring in the device 1000.

According to an embodiment, when a device usage inquiry is classified as an inquiry related to the trouble occurring in the device 1000, the device 1000 may determine a detailed response operation for trouble shooting of the device 1000 as a recommendation operation. For example, the device 1000 may determine an operation of providing a reply as a recommendation operation for trouble shooting of the device 1000. The device 1000 may determine an operation of executing a function of the device 1000 as a recommendation operation. The device 1000 may determine an operation of providing an operation guide that helps a user to enable the device 1000 to execute a function of the device 1000, as a recommendation operation.

According to an embodiment, the device 1000 may determine a recommendation operation for trouble shooting of the device 1000 based on the extracted operation scenario information 120. The device 1000 may determine a recommendation operation based on information about an execution order of detailed response operations included in the operation scenario information 120.

Specifically, when the device 1000 receives a user input of a device usage inquiry saying "The screen is yellow", from among a detailed response operation of stopping execution of a blue light filter included in the operation scenario information 120 and a detailed response operation of adjusting a color temperature of a display, the device 1000 may determine the detailed response operation of stopping execution of the blue light filter as a recommendation operation.

In operation S450, the device 1000 may execute the recommendation operation determined to solve the trouble occurring in the device 1000. Specifically, the device 1000 may execute a function of stopping execution of the blue light filter.

In operation S470, the device 1000 may check whether the trouble occurring in the device 1000 has been solved. The device 1000 may output a confirmation message for checking whether the trouble occurring in the device 1000 has been solved by executing the recommendation operation in operation S450 and may receive a user input with respect to the confirmation message. Specifically, the device 1000 may output a confirmation message for checking whether the trouble has been solved by executing a function of stopping execution of the blue light filter and may receive a user input with respect to the confirmation message.

In operation S490, the device 1000 may determine an additional recommendation operation for trouble shooting of the device 1000. The device 1000 may determine an additional recommendation operation for trouble shooting of the device 1000 based on the operation scenario information 120. The device 1000 may determine an additional recommendation operation based on the information about the execution order of the detailed response operations included in the operation scenario information 120. Specifically, the device 1000 may determine the detailed response operation of adjusting a color temperature of the display of the device 1000 as an additional recommendation operation based on the information about the execution order included in the operation scenario information 120.

In operation S491, the device 1000 may execute the additional recommendation operation determined to solve the trouble occurring in the device 1000. Specifically, the device 1000 may execute a function of adjusting the color temperature of the display of the device 1000.

Figure 5:
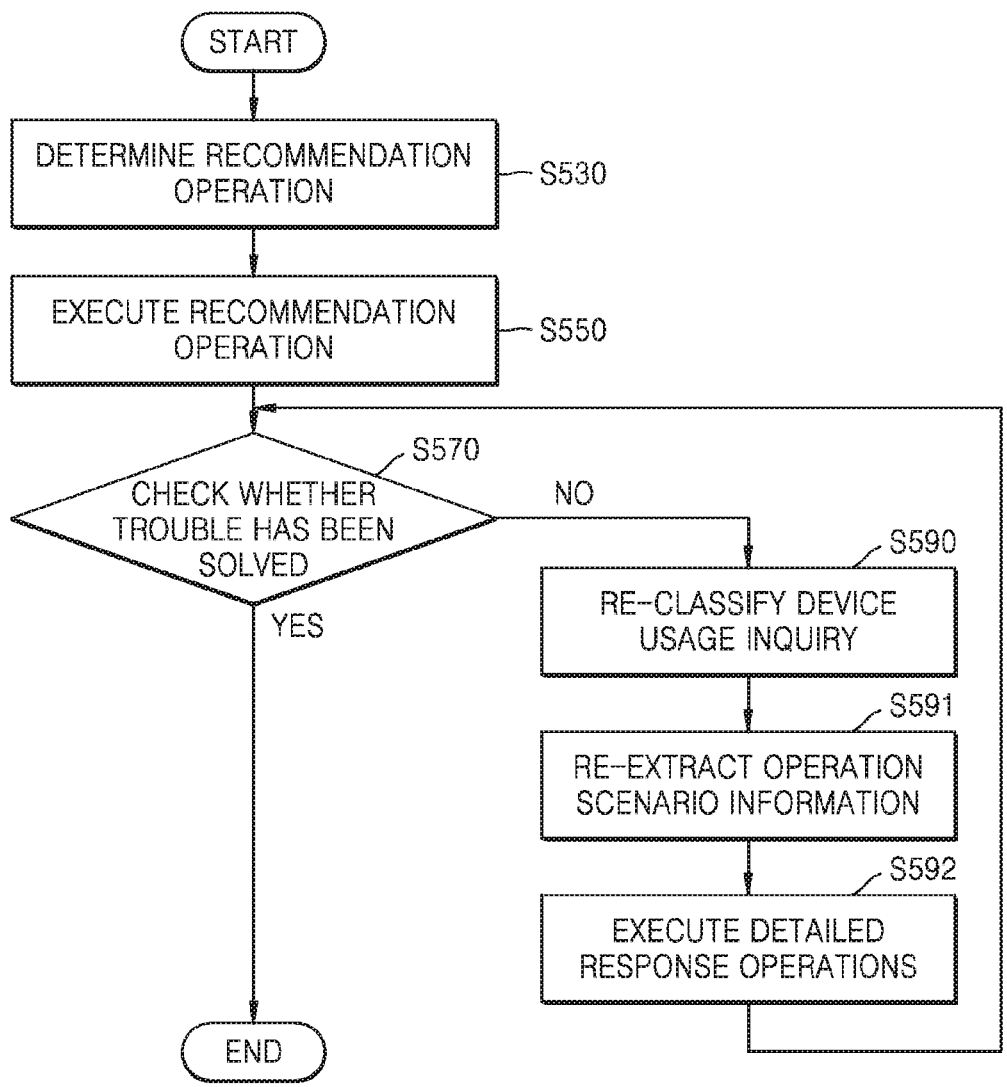
FIG. 5 is a flowchart of a method by which the device re-classifies a device usage inquiry according to whether trouble has been solved, according to one or more embodiments.

FIG. 5 is a flowchart of a method by which the device 1000 re-classifies a device usage inquiry according to whether trouble has been solved, according to one or more embodiments.

In operation S530, the device 1000 may determine a recommendation operation for solving trouble occurring in the device 1000. The device 1000 may determine a recommendation operation for trouble shooting of the device 1000 in a manner similar to that of operation S430, and thus a repeated explanation will not be given.

In operation S550, the device 1000 may execute the determined recommendation operation to solve the trouble occurring in the device 1000. The device 1000 may execute the recommendation operation for trouble shooting of the device 1000 in a manner similar to that of operation S450, and thus a repeated explanation will not be given.

In operation S570, the device 1000 may check whether the trouble occurring in the device 1000 has been solved. The device 1000 may check whether the trouble occurring in the device 1000 has been solved in a manner similar to that of operation S470, and thus a repeated explanation will not be given.

In operation S590, the device 1000 may re-classify a device usage inquiry to solve the trouble occurring in the device 1000.

Specifically, when the device 1000 receives a user input of a device usage inquiry saying "I cannot listen to music via a Bluetooth earphone", the device 1000 may classify the device usage inquiry as an inquiry about trouble occurring in a Bluetooth communication module. When the trouble has not been solved even after a function of connecting the device 1000 and the Bluetooth earphone is executed by the device 1000 in response to a result obtained by classifying the device usage inquiry as an inquiry about trouble occurring in the Bluetooth communication module, the device 1000 may re-classify the device usage inquiry as an inquiry about trouble in a music listening function.

The device 1000 may re-classify the device usage inquiry in a manner similar to that of operation S230, and thus a repeated explanation will not be given.

In operation S591, the device 1000 may re-extract operation scenario information based on a re-classification result.

Specifically, the device 1000 may re-extract the operation scenario information 120 based on a result obtained by re-classifying the device usage inquiry as an inquiry about trouble in a music listening function. The re-extracted operation scenario information 120 may include information about a detailed response operation of checking whether a music file is normal and a detailed response operation of checking whether a music playback application normally operates.

The device 1000 may re-extract the operation scenario information corresponding to the device usage inquiry in a manner similar to that of operation S250, and thus a repeated explanation will not be given.

In operation S592, the device 1000 may execute the detailed response operations based on the re-extracted operation scenario information. The device 1000 may execute detailed response operations based on the information about the detailed response operations included in the re-extracted operation scenario information.

Specifically, the device 1000 may execute the detailed response operation of checking whether a music file included in the operation scenario information 120 is normal and the detailed response operation of checking whether a music playback application normally operates.

The device 1000 may execute the detailed response operations based on the re-extracted operation scenario information in a manner similar to that of operation S270, and thus a repeated explanation will not be given.

FIG. 6 is a table showing categories of device usage inquiries, according to one or more embodiments.

Referring to FIG. 6, the device 1000 may classify device usage inquiries by analyzing received user inputs. The device 1000 may classify the device usage inquiries into a plurality of categories. Each of the plurality of categories may be hierarchical. That is, each of the plurality of categories may be re-classified into a plurality of lower categories.

According to an embodiment, device usage inquiries may be classified into a first category including an inquiry about a method of using the device 1000 and an inquiry about a method of solving trouble occurring in the device 1000.

According to an embodiment, device usage inquiries about the method of solving the trouble occurring in the device 1000 may be classified into a second category including an inquiry related to trouble in a function of executing the device 1000 and an inquiry related to trouble occurring in a hardware module of the device 1000.

According to an embodiment, the inquiry related to trouble in a function of executing the device 1000 may be classified into a third category including trouble in functions such as a function of making a call, a function of sending text, a function of transferring a file, a function of taking a photo and a video, a function of watching a photo and a video, a function of listening to music, a function of doing a search, a function of connecting to a peripheral device, and a function of sending money.

According to an embodiment, the inquiry related to trouble occurring in a hardware module of the device 1000 may be classified into a third category including trouble occurring in hardware modules such as a battery, a display, a phone, a communication module such as the Internet or Bluetooth, a volume controller, a camera, and a biometric sensor.

According to an embodiment, the inquiry about a method of using a function executed by the device 1000 may be classified into a third category including functions such as a function of making a call, a function of sending text, a function of transferring a file, a function of taking a photo and a video, a function of watching a photo and a video, a function of listening to music, a function of doing a search, a function of connecting to a peripheral device, and a function of sending money.

According to an embodiment, each of categories of device usage inquiries may be related to at least one operation scenario.

Specifically, a device usage inquiry saying "The screen is yellow" may be classified as an inquiry about a method of solving trouble occurring in a device of a first category, may be classified as an inquiry about trouble occurring in a hardware module of the device of a second category, and may be classified as an inquiry about trouble occurring in a display module of a third category. In this case, the category of the device usage inquiry that is classified as an inquiry about trouble occurring in a display module may be related to an operation scenario including information about a detailed response operation of stopping execution of a blue light filter and a detailed response operation of adjusting a color temperature of a display.

One category may be related to a plurality of operation scenarios or a plurality of categories may be related to the same operation scenario.

Figure 7:
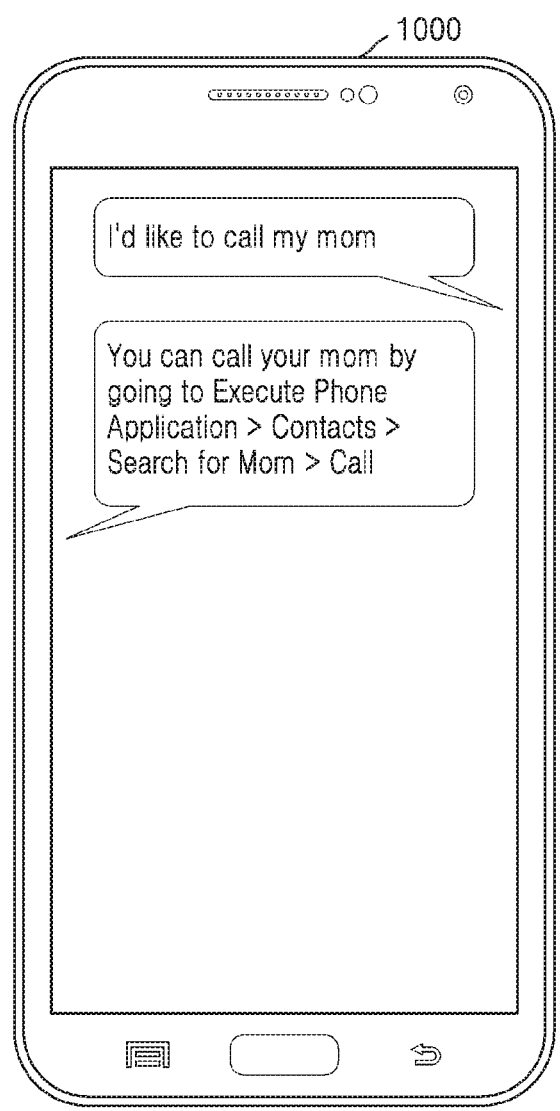
FIG. 7 is a view illustrating an example in which the device provides a reply corresponding to an inquiry about a method of using the device, according to one or more embodiments.

FIG. 7 is a view illustrating an example in which the device 1000 provides a reply corresponding to an inquiry about a method of using the device 1000, according to one or more embodiments.

Referring to FIG. 7, the device 1000 may receive a user input of a device usage inquiry saying "I'd like to call my mom". The device 1000 may receive, but is not limited to, text, a voice, an image, a video, or a combination thereof as a user input of the device usage inquiry.

The device 1000 may classify the device usage inquiry as an inquiry about a method of using a call-making function of the device 1000 by inputting the user input of the device usage inquiry saying "I'd like to call my mom" to a learning model.

The device 1000 may extract operation scenario information for providing a reply based on a classification result of the device usage inquiry. The extracted operation scenario information may include information about detailed response operations related to the call-making function of the device 1000. For example, the information about the detailed response operations related to the call-making function may include information about a detailed response operation of selecting contracts in a phone application, a detailed response operation of doing a search, a detailed response operation of outputting a search result, and a detailed response operation of making a call in response to the user input.

The device 1000 may output, as text, a reply message saying "You can call your mom by going to Execute Phone Application>Contacts>Search for Mom>Call, based on the extracted operation scenario information. The device 1000 may output the reply message as a voice. The device 1000 may output, as an image, a part of a user manual in which a method of using the phone application is written in response to the received user input. The device 1000 may output a video about the method of using the phone application in response to the received user input.

Figure 8A:
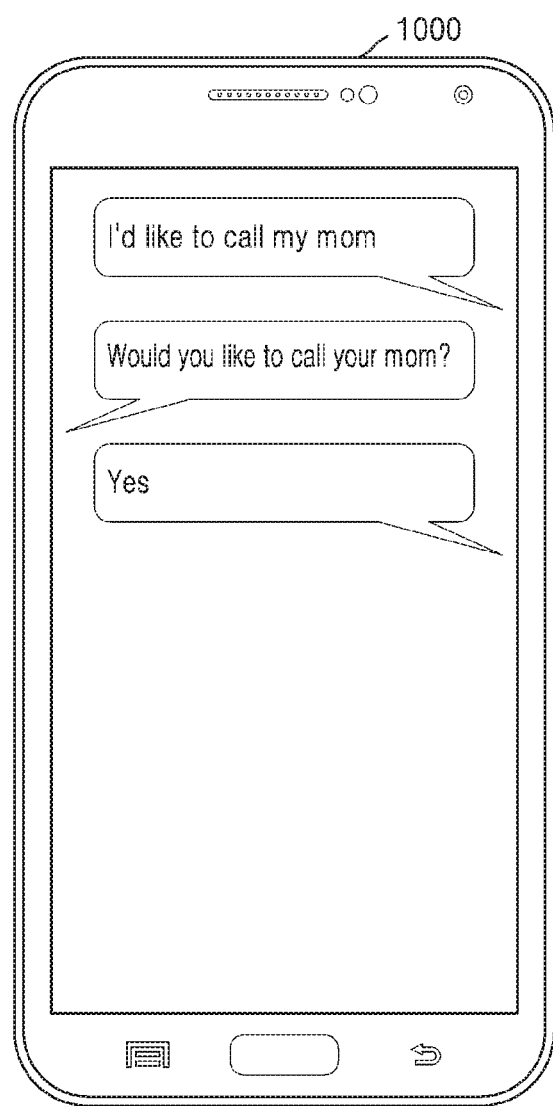
FIGS. 8A and 8B are views illustrating an example in which the device executes a function corresponding to an inquiry about a method of using the device, according to one or more embodiments.
Figure 8B:
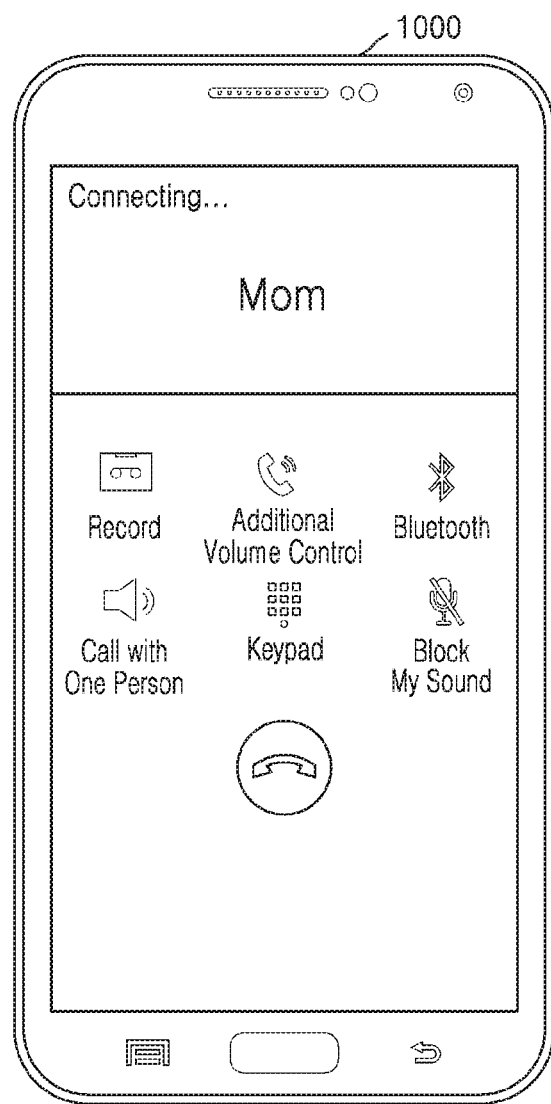

FIGS. 8A and 8B are views illustrating an example in which the device 1000 executes a function corresponding to an inquiry about a method of using the device 1000, according to one or more embodiments.

Referring to FIG. 8A, the device 1000 may receive a user input of a device usage inquiry saying "I'd like to call my mom" and may classify the device usage inquiry as an inquiry about a method of using a call-making function of the device 1000 by inputting the user input of the device usage inquiry to a learning model.

The device 1000 may extract operation scenario information for executing a function corresponding to the device usage inquiry based on a classification result of the device usage inquiry. The extracted operation scenario information may include information about detailed response operations related to the call-making function of the device 1000. For example, the information about the detailed response operations related to the call-making function may include information about a detailed response operation of outputting a confirmation message to a user, a detailed response operation of executing a phone application, a detailed response operation of doing a search in contacts included in the phone application, and a detailed response operation of making a call in response to a search result.

The device 1000 may execute a function corresponding to an inquiry about a method of using the device 1000 based on the information about the detailed response operations included in the operation scenario information. The device 1000 may output a confirmation message saying "Would you like to call your mom?" in response to a user input.

Referring to FIG. 8B, the device 1000 may execute the phone application based on a user input with respect to the confirmation message. The device 1000 may execute a function of calling mom by using the executed phone application. The device 1000 may execute a function of making a call to the user's mom by executing the phone application without outputting the confirmation message corresponding to the user input.

FIGS. 9A through 9E are views illustrating an example in which the device 1000 provides an operation guide corresponding to an inquiry about a method of using the device 1000, according to one or more embodiments.

Figure 9A:
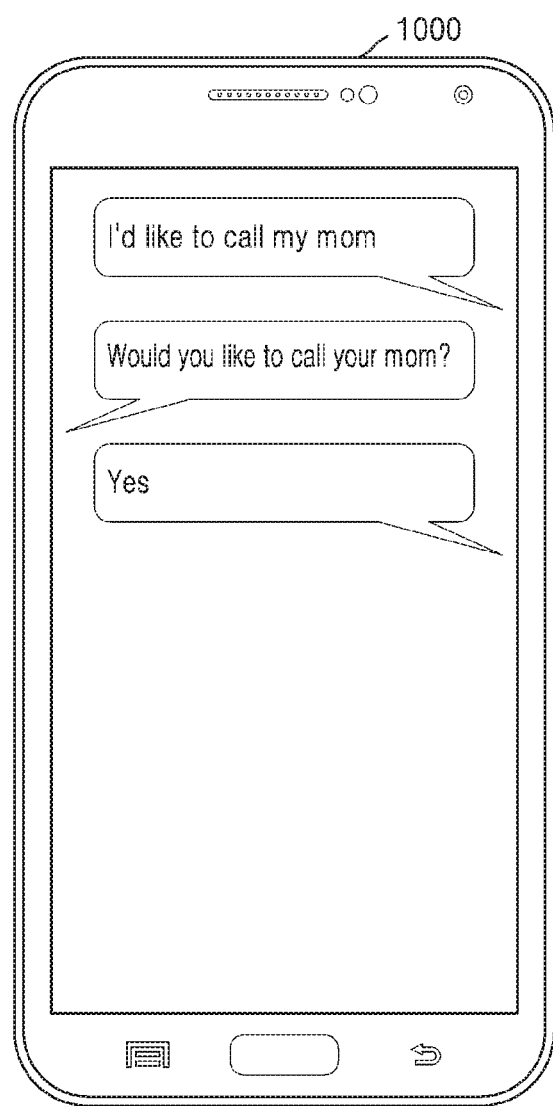
FIGS. 9A through 9E are views illustrating an example in which the device provides an operation guide corresponding to an inquiry about a method of using the device, according to one or more embodiments.

Referring to FIG. 9A, the device 1000 may receive a user input of a device usage inquiry saying "I'd like to call my mom" and may classify the device usage inquiry as an inquiry about a method of using a call-making function of the device 1000 by inputting the user input of the device usage inquiry to a learning model.

The device 1000 may extract operation scenario information for providing an operation guide based on a classification result of the device usage inquiry. The extracted operation scenario information may include information about detailed response operations related to the call-making function of the device 1000. For example, the information about the detailed response operations related to the call-making function may include information about a detailed response operation of outputting a confirmation message to a user, a detailed response operation of selecting contacts in a phone application, a detailed response operation of doing a search, a detailed response operation of outputting a search result, and a detailed response operation of making a call in response to a user input, and information about a detailed response operation of displaying an operation guide that helps the user to execute a detailed response operation. Displaying the operation guide may include displaying a box around a suggested operation on the display.

The device 1000 may provide an operation guide corresponding to an inquiry about a method of using the device 1000 based on the information about the detailed response operations included in the operation scenario information. The device 1000 may output a confirmation message saying "Would you like to call your mom?" in response to a user input. The device 1000 may provide an operation guide that helps the user to execute the phone application based on a user input with respect to the confirmation message. The device 1000 may provide the operation guide for executing the phone application without outputting the confirmation message corresponding to the user input.

Figure 9B:
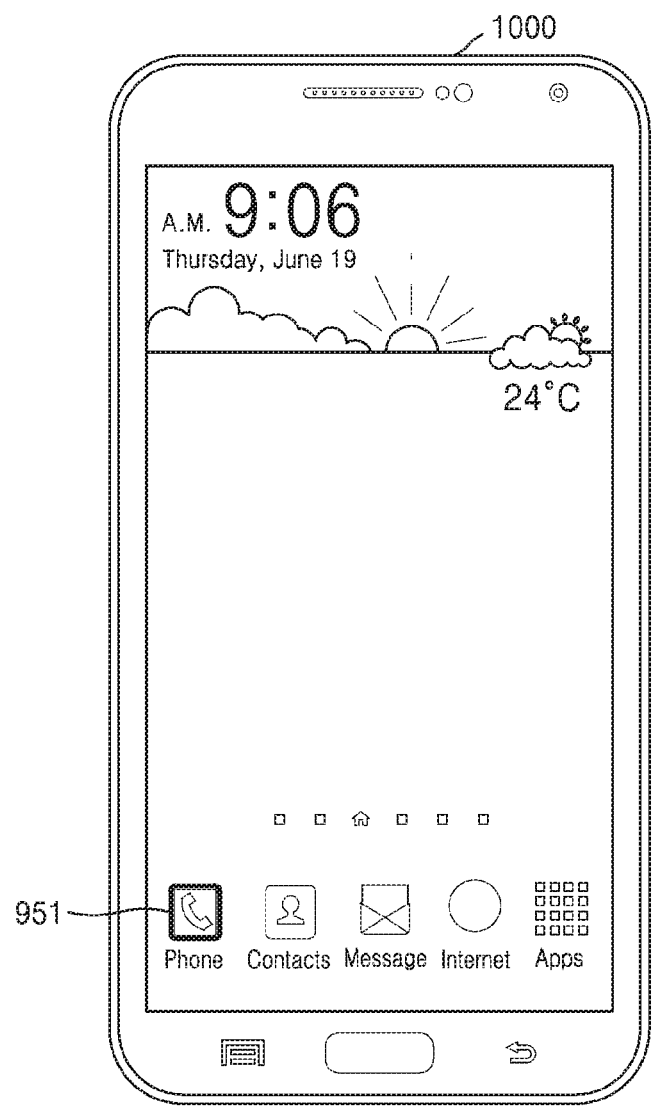

Referring to FIG. 9B, the device 1000 may provide an operation guide 951 for selecting the phone application on a home screen. The device 1000 may execute the phone application based on a user input corresponding to the provided operation guide 951.

Figure 9C:
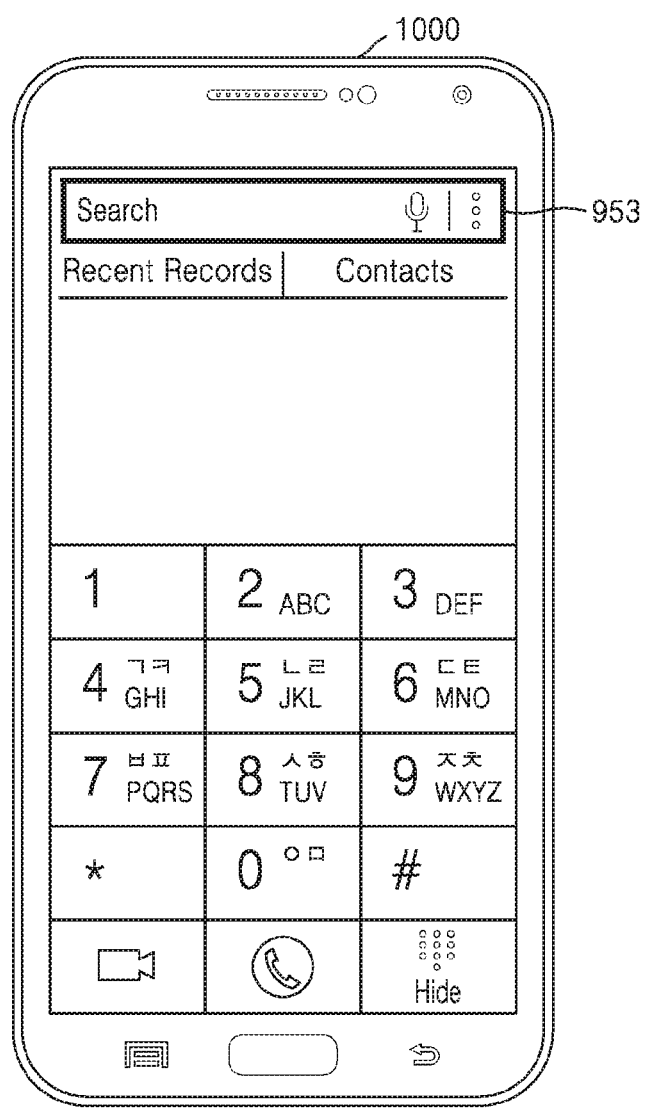

Referring to FIG. 9C, the device 1000 may provide an operation guide 953 for displaying a search box so that the user may search for his/her mom in the executed phone application. The device 1000 may execute a function of searching for the user's mom based on a user input corresponding to the provided operation guide 953.

Figure 9D:
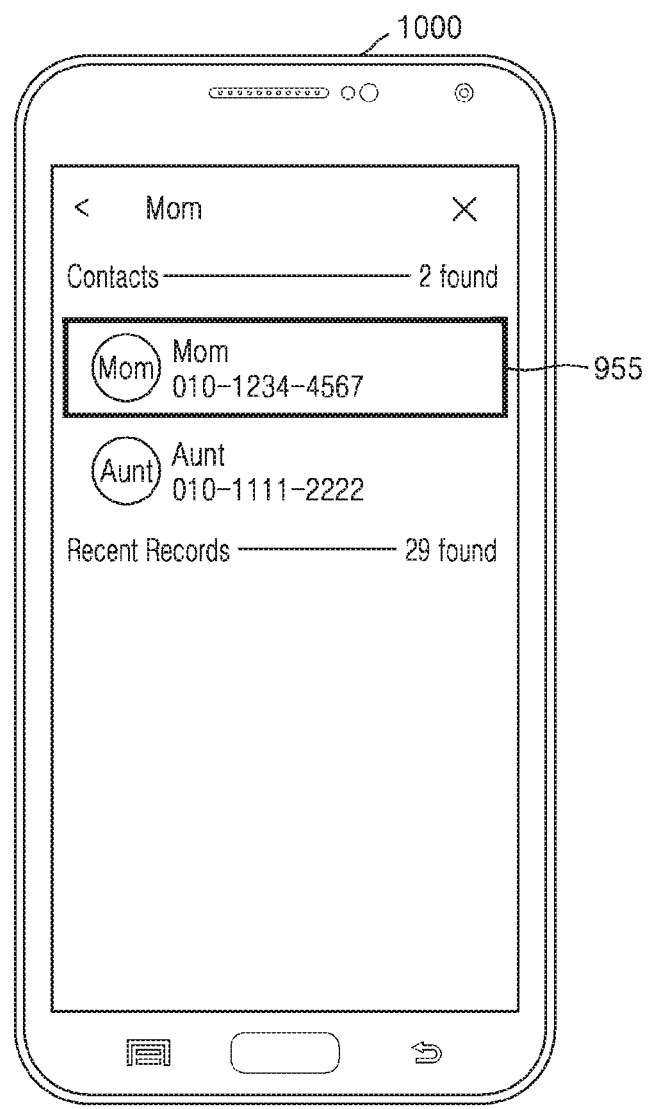

Referring to FIG. 9D, the device 1000 may output a search result obtained after searching for the user's mom. The device 1000 may provide an operation guide 955 that helps the user to select his/her mom from the search result.

Figure 9E:
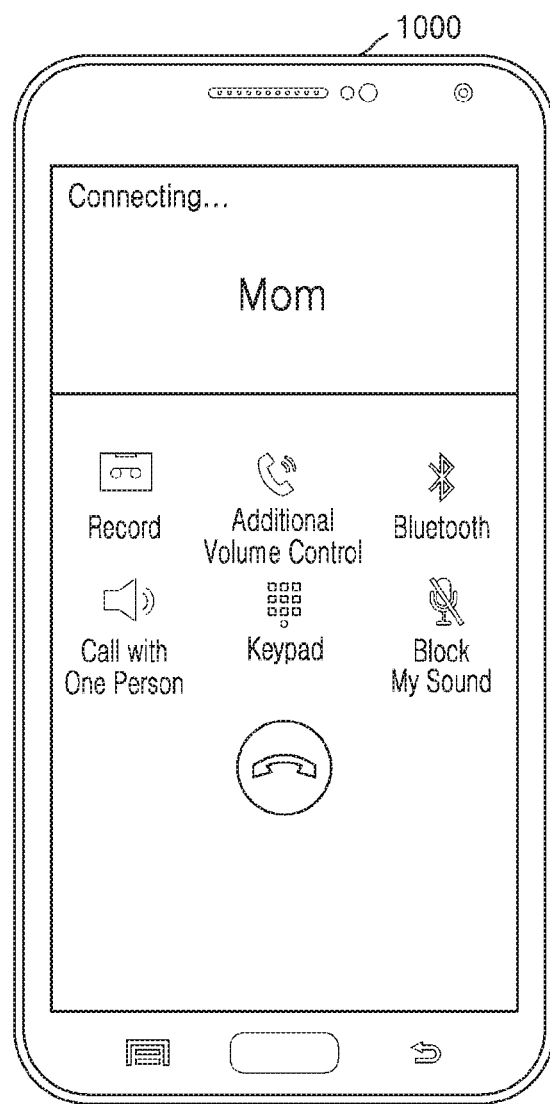

Referring to FIG. 9E, the device 1000 may execute a function of making a call to the user's mom based on a user input corresponding to the provided operation guide 955.

Figure 10:
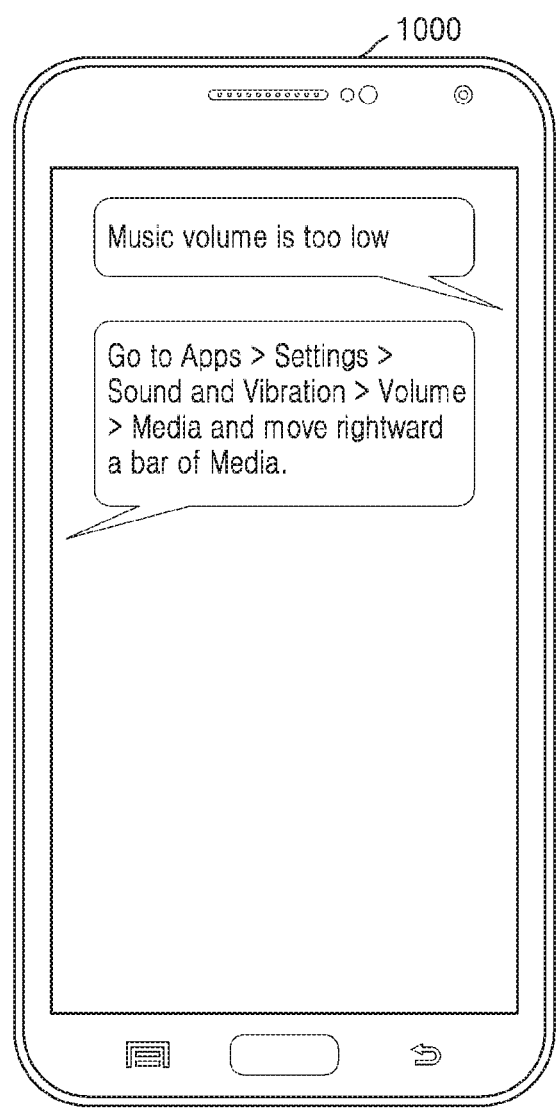
FIG. 10 is a view illustrating an example in which the device provides a reply corresponding to an inquiry about trouble occurring in the device, according to one or more embodiments.

FIG. 10 is a view illustrating an example in which the device 1000 provides a reply corresponding to an inquiry about trouble occurring in the device 1000, according to one or more embodiments.

Referring to FIG. 10, the device 1000 may receive a user input of a device usage inquiry saying "Music volume is too low".

The user input may be, but is not limited to, text, a voice, an image, a video, or a combination thereof. The device 1000 may receive text through a user input interface. The device 1000 may execute a voice assistant application and may receive a user's voice input through a microphone by controlling the executed voice assistant application. The device 1000 may convert a voice received as the user input of the device usage inquiry into text through speech to text (STT). An image file input to the device 1000 showing trouble occurring in the device 1000 may be an image captured by a camera or a screenshot generated in the device 1000. As another example, the device 1000 may receive a video file as the user input of the device usage inquiry. The device 1000 may receive, as the user input, an Internet address indicating a video file related to the device usage inquiry. The video file input to the device 1000 showing trouble occurring in the device 1000 may be a video captured by the camera.

The device 1000 may classify the device usage inquiry as an inquiry about a method of solving trouble occurring in the device 1000 of a first category, as an inquiry about trouble occurring in a hardware module of the device 1000 of a second category, and as an inquiry about trouble occurring in a volume control module of a third category by inputting the received user input to a learning model.

The device 1000 may extract operation scenario information for providing a reply based on a classification result of the device usage inquiry. The extracted operation scenario information may include information about detailed response operations related to a volume control mode of the device 1000. For example, the information about the detailed response operations related to the volume control mode may include information about a detailed response operation of selecting a sound and vibration category in a settings application, a detailed response operation of selecting a volume category in the sound and vibration category, a detailed response operation of selecting a media volume in the volume category, and a detailed response operation of adjusting the media volume according to a status bar of the media volume.

The device 1000 may output, as text, a reply message saying "Go to Apps>Settings>Sound and Vibration>Volume>Media and move rightward a bar of Media", based on the extracted operation scenario information. The device 1000 may output the reply message as a voice. The device 1000 may output a part of a user manual in which a method of using a settings application is written as an image in response to the received user input. The device 1000 may output a video about a method of using a phone application in response to the received user input.

Figure 11A:
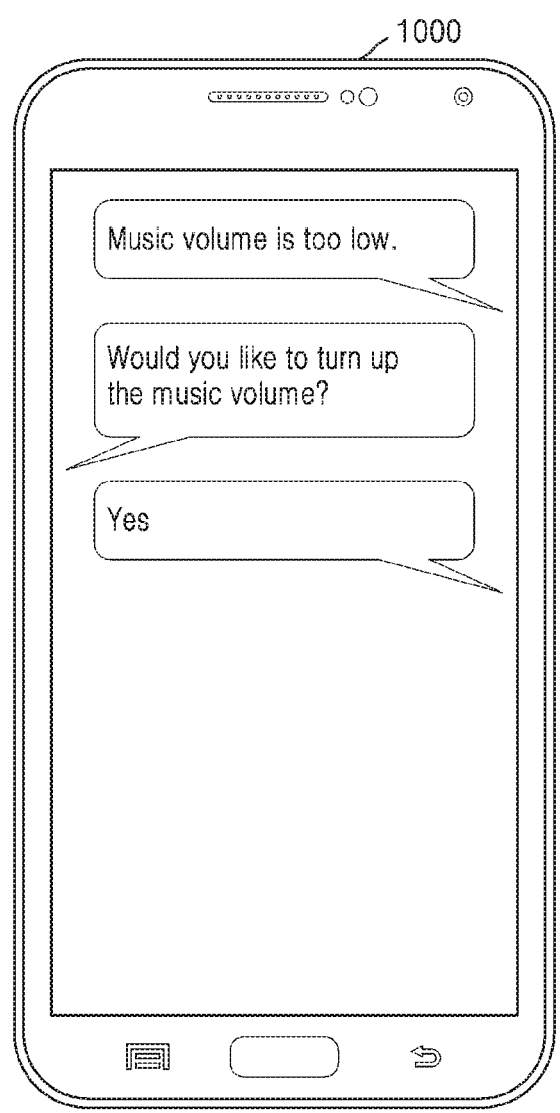
FIGS. 11A and 11B are views illustrating an example in which the device executes a function corresponding to an inquiry about trouble occurring in the device, according to one or more embodiments.
Figure 11B:
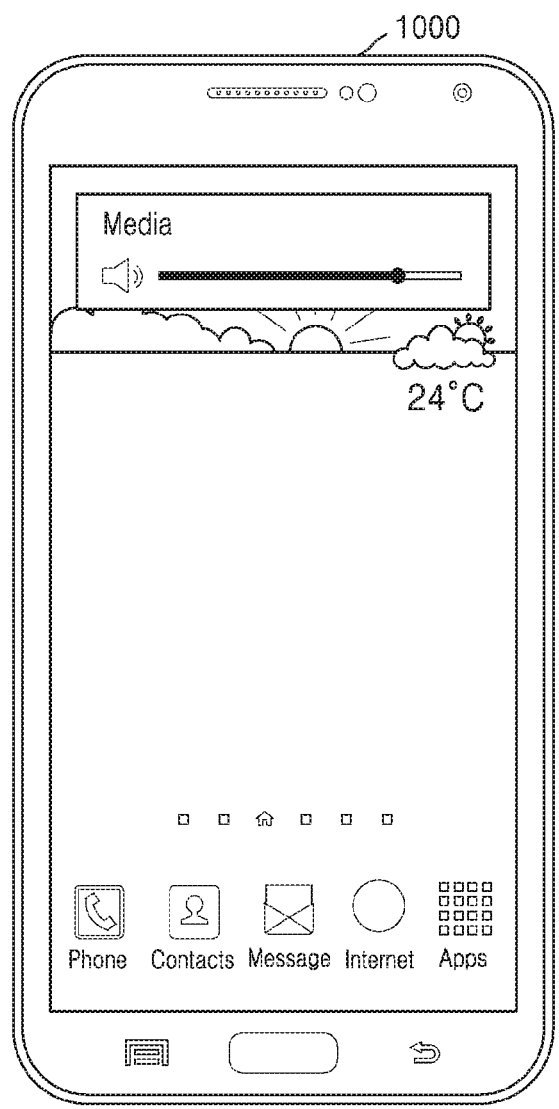

FIGS. 11A and 11B are views illustrating an example in which the device 1000 executes a function corresponding to an inquiry about trouble occurring in the device 1000, according to one or more embodiments.

Referring to FIG. 11A, the device 1000 may receive a user input of a device usage inquiry saying "Music volume is too low", and may classify the device usage inquiry as an inquiry about a method of solving trouble occurring in the device 1000 of a first category, as an inquiry about trouble occurring in a hardware module of the device of a second category, and as an inquiry about trouble occurring in a volume control module of a third category by inputting the user input of the device usage inquiry to a learning model.

The device 1000 may extract operation scenario information for executing a function based on a classification result of the device usage inquiry. The extracted operation scenario information may include information about detailed response operations related to a volume control mode of the device 1000. For example, the information about the detailed response operations related to the volume control mode may include information about a detailed response operation of outputting a confirmation message to a user, a detailed response operation of executing a settings application, and a detailed response operation of executing a function of adjusting a media volume included in the settings application.

The device 1000 may execute a function corresponding to an inquiry about trouble occurring in the device 1000 based on the information about the detailed response operations included in the operation scenario information. The device 1000 may output a confirmation message saying "Would you like to turn up the music volume?" in response to the user input.

Referring to FIG. 11B, the device 1000 may execute a function of adjusting a media volume based on a user input with respect to the confirmation message. The device 1000 may execute a function of adjusting a media volume without outputting the confirmation message corresponding to the user input.

FIGS. 12A through 12F are views illustrating an example in which the device 1000 provides an operation guide corresponding to an inquiry about trouble occurring in the device 1000, according to one or more embodiments.

Figure 12A:
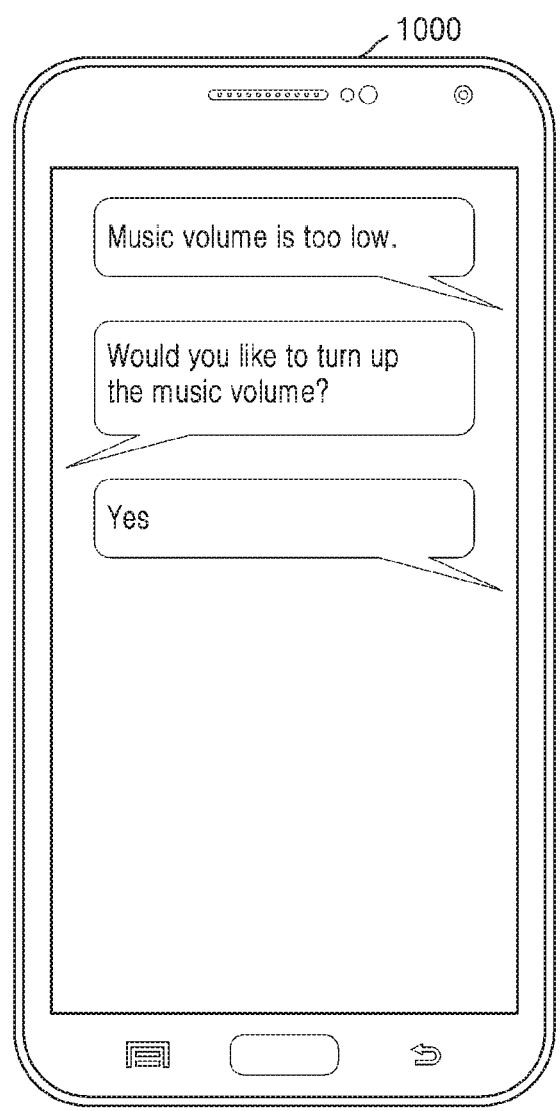
FIGS. 12A through 12F are views illustrating an example in which the device provides an operation guide corresponding to an inquiry about trouble occurring in the device, according to one or more embodiments.

Referring to FIG. 12A, the device 1000 may receive a user input of a device usage inquiry saying "Music volume is too low", and may classify the device usage inquiry as an inquiry about a method of solving trouble occurring in the device 1000 of a first category, as an inquiry about trouble occurring in a hardware module of the device 1000 of a second category, and as an inquiry about trouble occurring in a volume control module of a third category by inputting the device usage inquiry to a learning model.

The device 1000 may extract operation scenario information for providing an operation guide based on a classification result of the device usage inquiry. The extracted operation scenario information may include information about detailed response operations related to a volume control mode of the device 1000. For example, the information about the detailed response operations related to the volume control mode may include information about a detailed response operation of selecting a sound and vibration category in a settings application, a detailed response operation of selecting a volume category in the sound and vibration category, a detailed response operation of selecting a media volume in the volume category, and a detailed response operation of adjusting the media volume by moving a status bar of the media volume, and information about a detailed response operation of displaying an operation guide that helps a user to execute a detailed response operation.

The device 1000 may provide an operation guide corresponding to an inquiry about a method of using the device 1000 based on the information about the detailed response operations included in the operation scenario information. The device 1000 may output a confirmation message saying "Would you like to turn up the music volume?" in response to the user input. The device 1000 may provide an operation guide for executing a function of adjusting a media volume based on a user input for the confirmation message. The device 1000 may provide an operation guide for executing a function of adjusting a media volume without outputting the confirmation message corresponding to the user input.

Figure 12B:
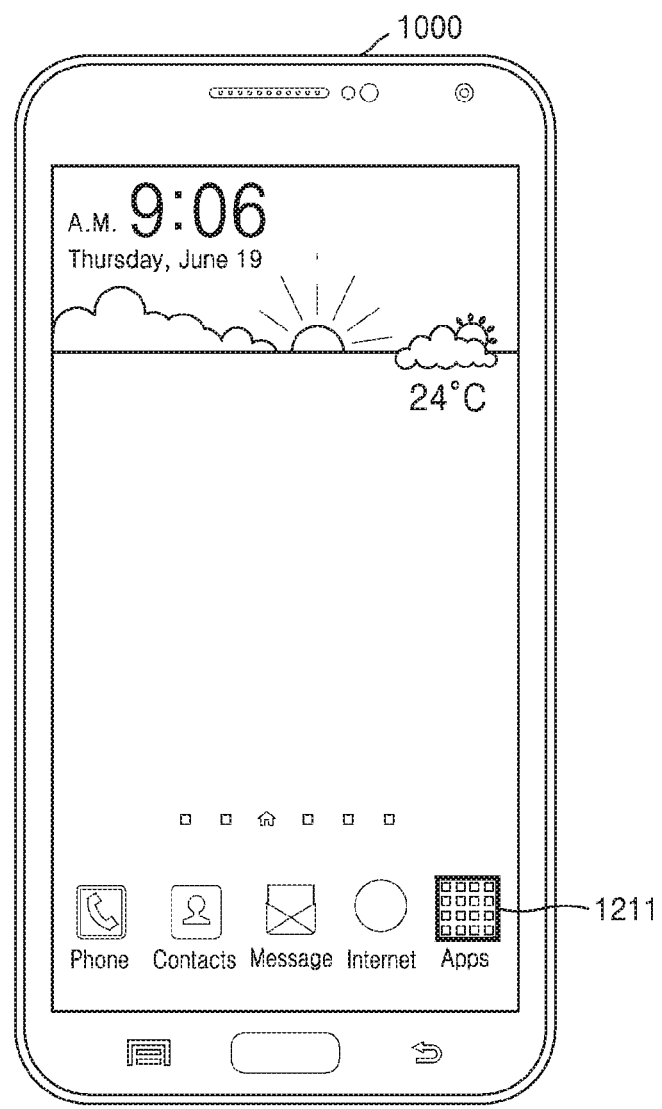

Referring to FIG. 12B, the device 1000 may provide an operation guide 1211 for selecting Apps to select a settings application on a home screen. The device 1000 may execute an application drawer based on a user input corresponding to the provided operation guide 1211.

Figure 12C:
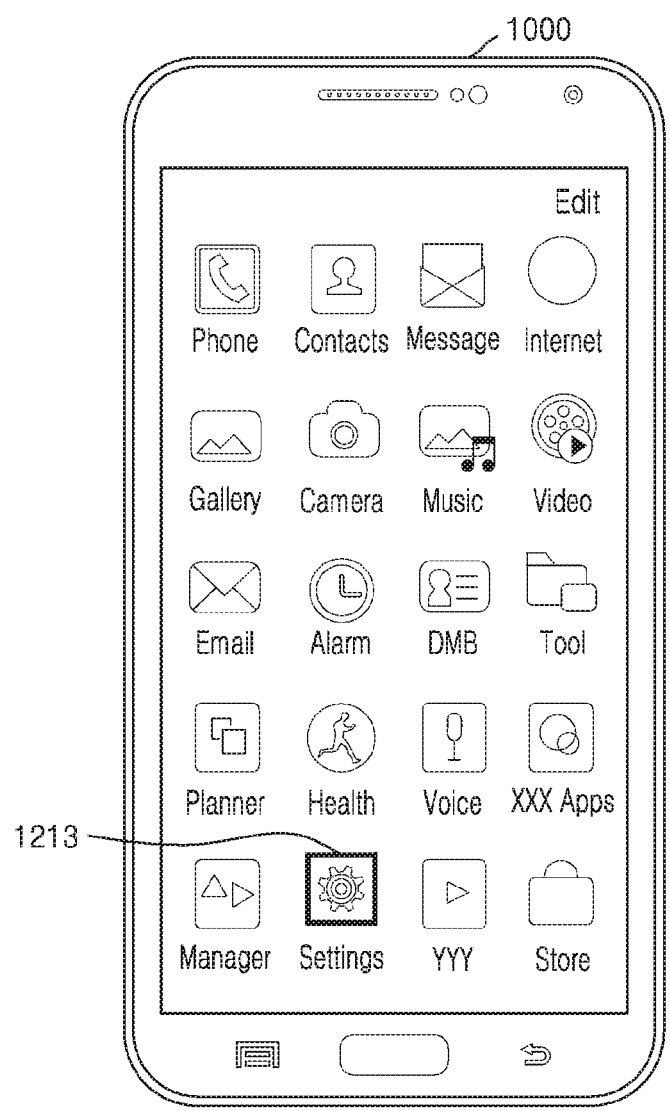

Referring to FIG. 12C, the device 1000 may provide an operation guide 1213 for selecting the settings application in response to the received user input. The device 1000 may execute the settings application based on a user input corresponding to the provided operation guide 1213.

Figure 12D:
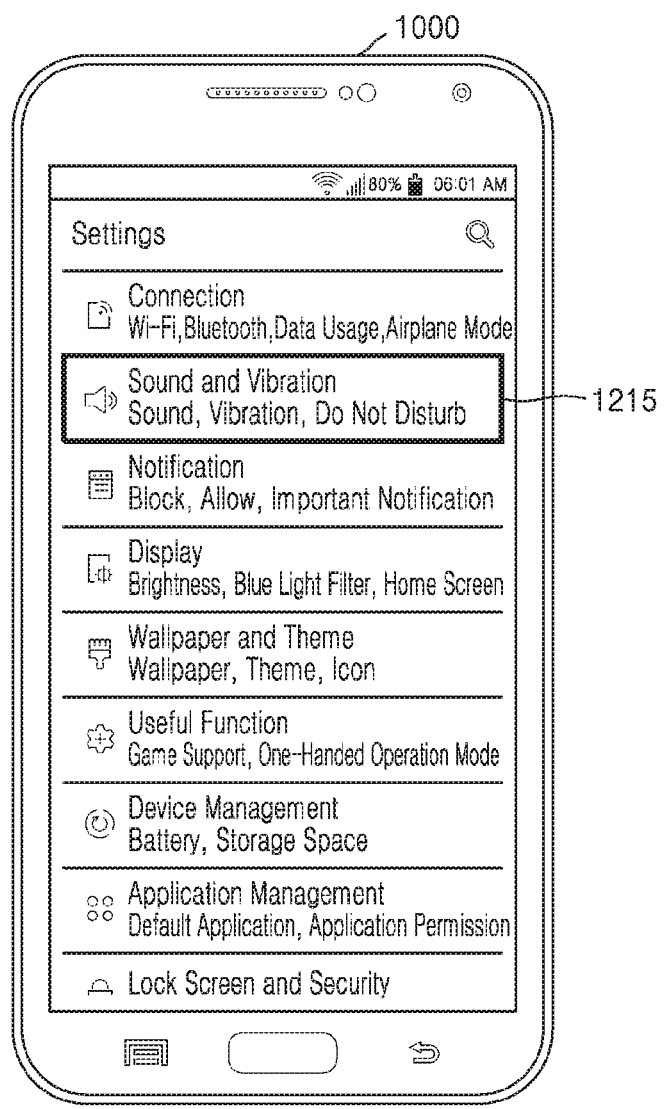

Referring to FIG. 12D, the device 1000 may provide an operation guide 1215 that helps the user to select a category of adjusting a sound and vibration in the executed settings application. The device 1000 may execute a function of adjusting a sound and vibration based on a user input corresponding to the provided operation guide 1215.

Figure 12E:
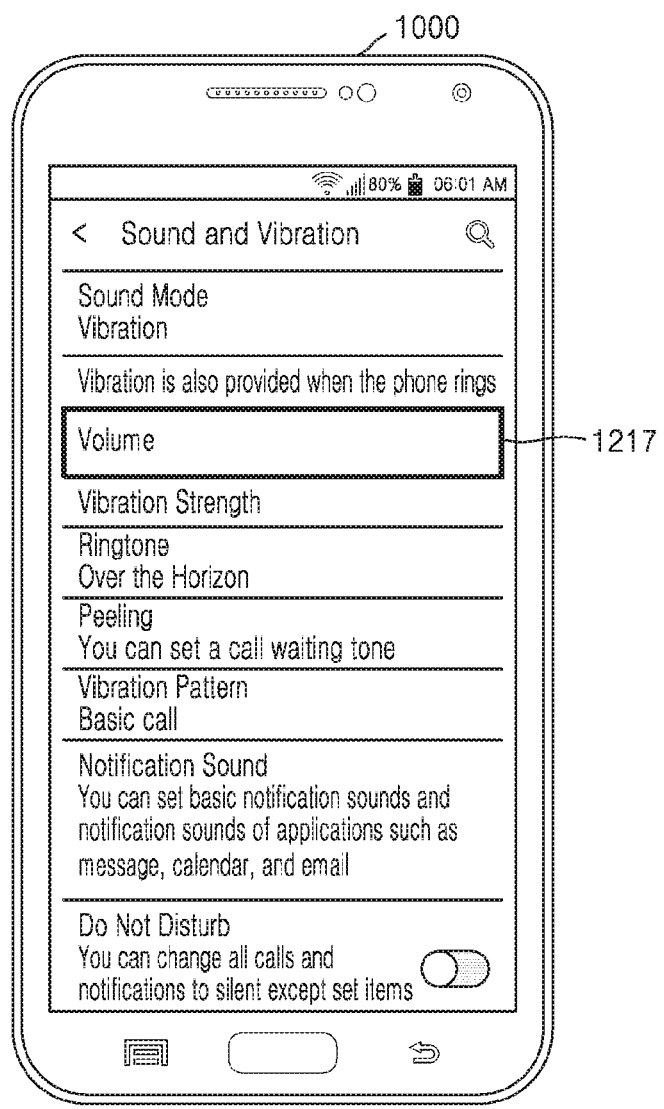

Referring to FIG. 12E, the device 1000 may provide an operation guide 1217 that helps the user to select a category of adjusting a volume in the category of adjusting a sound and vibration. The device 1000 may execute a function of adjusting a volume based on a user input corresponding to the provided operation guide 1217.

Figure 12F:
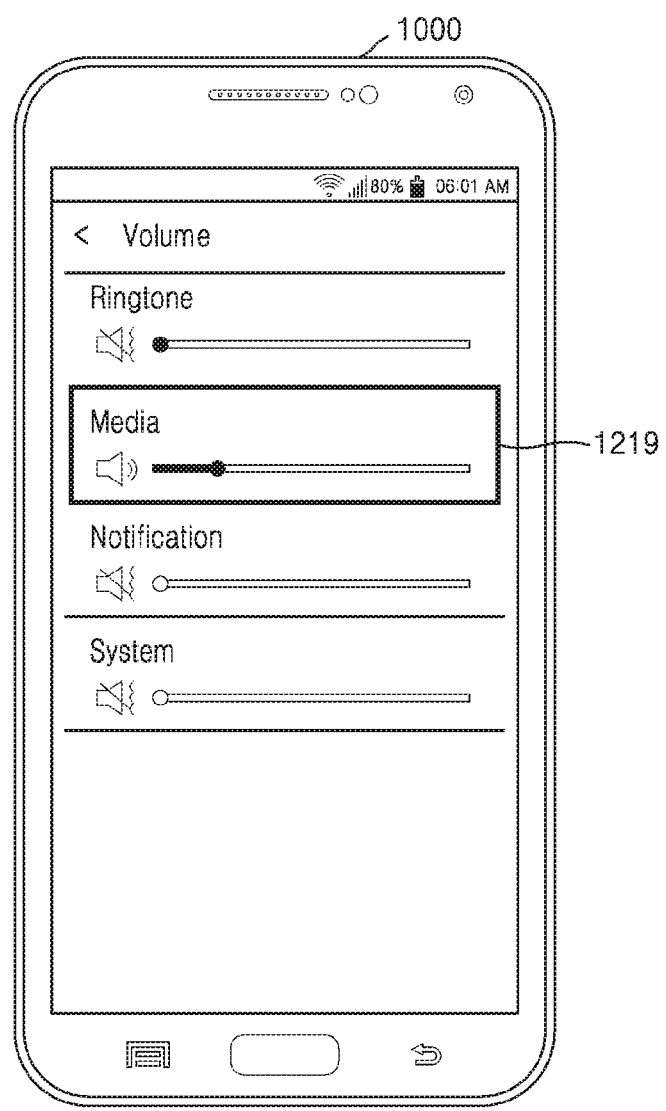

Referring to FIG. 12F, the device 1000 may execute a function of displaying status bars for adjusting volumes. The device 1000 may provide an operation guide 1219 that helps the user to adjust a status bar of adjusting a volume of a media from among the plurality of status bars for adjusting volumes. The device 1000 may execute a function of adjusting a volume of a media in response to a user input corresponding to the provided operation guide 1219.

Figure 13A:
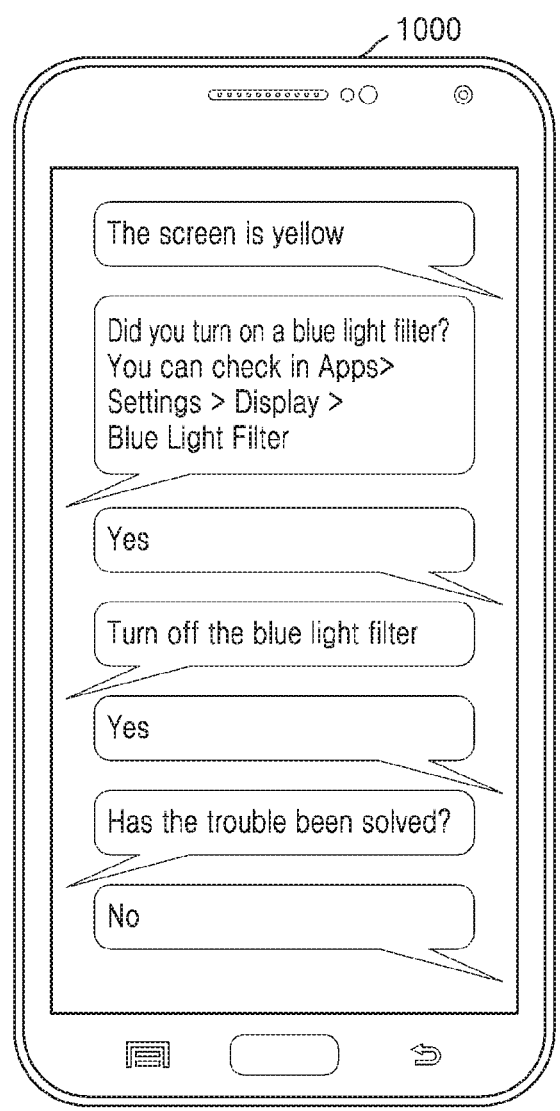
FIGS. 13A and 13B are views illustrating an example in which the device sequentially provides replies corresponding to an inquiry about trouble occurring in the device, according to one or more embodiments.
Figure 13B:
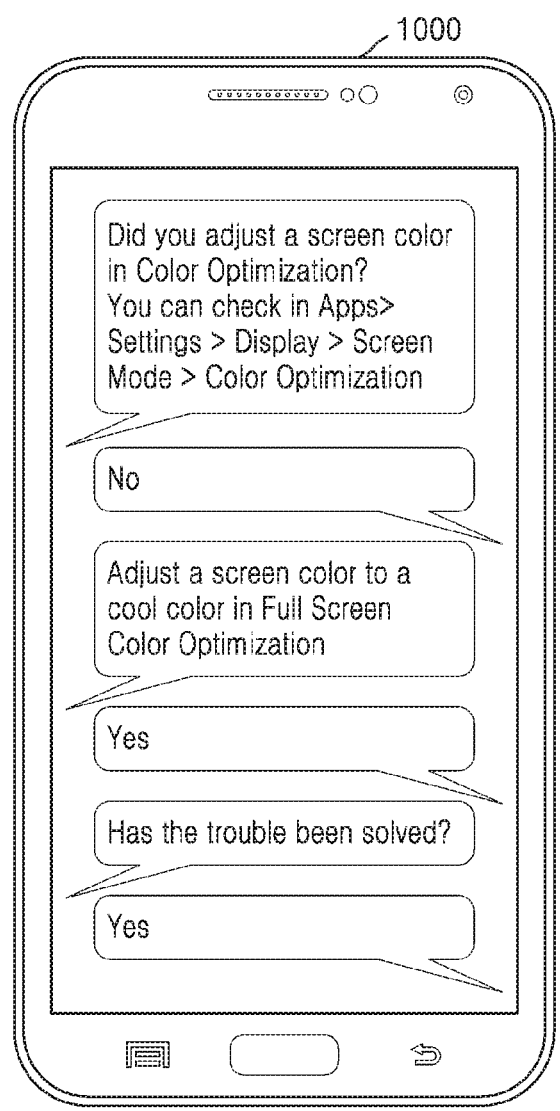

FIGS. 13A and 13B are views illustrating an example in which the device 1000 sequentially provides replies corresponding to an inquiry about trouble occurring in the device 1000, according to one or more embodiments.

Referring to FIGS. 13A and 13B, the device 1000 may receive a user input for a device usage inquiry saying "The screen is yellow", and may classify the device usage inquiry as an inquiry about a method of solving trouble occurring in the device 1000 of a first category, as an inquiry about trouble occurring in a hardware module of the device 1000 of a second category, and as an inquiry about trouble occurring in a display module of a third category by inputting the user input of the device usage inquiry to a learning model. The device 1000 may extract operation scenario information for providing a reply based on a classification result of the device usage inquiry.

The extracted operation scenario information 120 may include information about a detailed response operation for stopping execution of a blue light filter and a detailed response operation of adjusting a color temperature of a display of the device 1000. Also, the extracted operation scenario information 120 may include information about an execution order of the detailed response operation for stopping execution of the blue light filter and the detailed response operation of adjusting a color temperature of the display of the device 1000.

The device 1000 may determine the detailed response operation of stopping execution of the blue light filter as a recommendation operation and may execute the recommendation operation.

The device 1000 may sequentially provide replies corresponding to an inquiry about trouble occurring in a display module of the device 1000 based on the information about the detailed response operations included in the extracted operation scenario information and the information about the order of the detailed response operations. The device 1000 may output, as text, a reply message saying "Did you turn on a blight light filter? You can check in Apps>Settings>Display>Blue Light Filter". The device 1000 may output the reply message as a voice. The device 1000 may output, as an image, a part of a user manual in which a method of stopping execution of the blue light filter is written in response to the received user input. The device 1000 may output a video about a method of stopping execution of the blue light filter in response to the received user input.

The device 1000 may output an additional reply message saying "Turn off the blue light filter" based on a user input for the reply message. The device 1000 may output a confirmation message saying "Has the trouble been solved?" to check whether trouble has been solved based on a user input for the additional reply message.

Referring to FIG. 13B, the device 1000 may output an additional reply message saying "Did you adjust a screen color in Color Optimization? You can check in Apps>Settings>Display>Screen Mode>Color Optimization" based on a user input with respect to the confirmation message. The device 1000 may output an additional reply message saying "Adjust a screen color to a cool color in Full Screen Color Optimization" based on a user input for the additional reply message. The device 1000 may output the additional reply message as text or a voice. The device 1000 may output, as an image, a part of a user manual in which a method of adjusting a screen color to a cool color is written. The device 1000 may output a video about a method of adjusting a screen color to a cool color.

The device 1000 may output a confirmation message saying "Has the trouble been solved?" to check whether the trouble has been solved based on a user input for the additional reply message.

FIGS. 14A through 14E are views illustrating an example in which the device 1000 sequentially executes functions corresponding to an inquiry about trouble occurring in the device 1000, according to one or more embodiments.

Figure 14A:
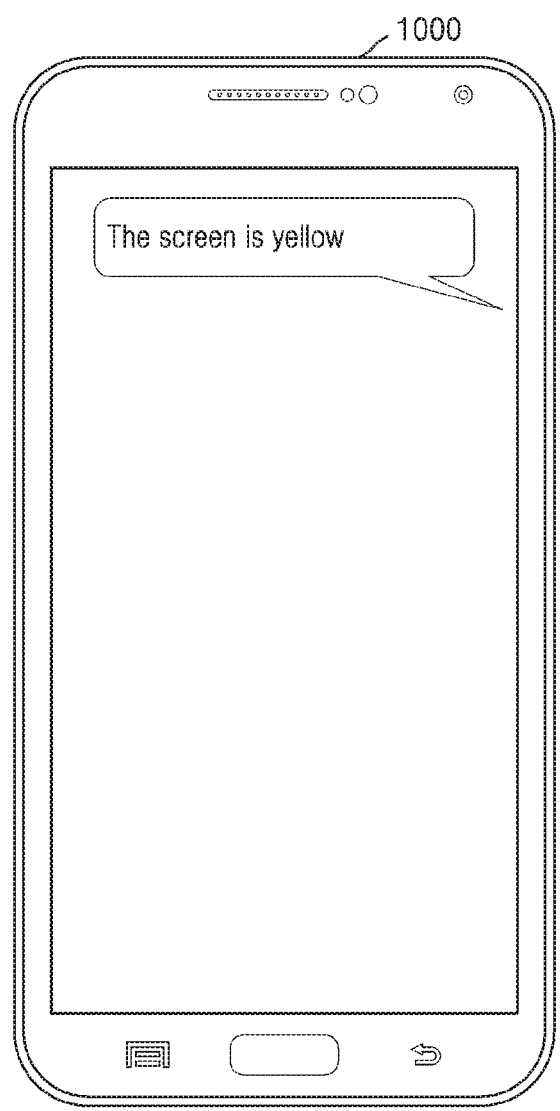
FIGS. 14A through 14E are views illustrating an example in which the device sequentially executes functions corresponding to an inquiry about trouble occurring in the device, according to one or more embodiments.

Referring to FIG. 14A, the device 1000 may extract operation scenario information for executing a function corresponding to trouble occurring in the device 1000 based on a result obtained by classifying a device usage inquiry as an inquiry about trouble occurring in a display module. The device 1000 may execute a function corresponding to trouble occurring in the device 1000 based on information about detailed response operations included in the operation scenario information. For example, the device 1000 may receive a user input for a device usage inquiry saying "The screen is yellow."

Figure 14B:
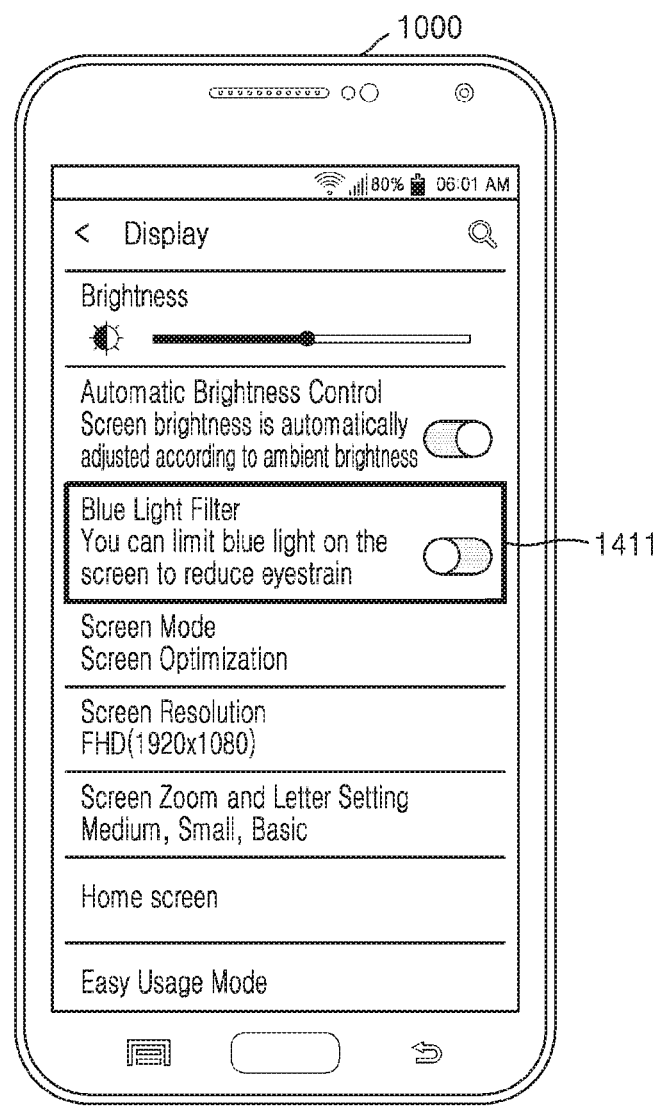

Referring to FIG. 14B, the device 1000 may execute a function 1411 of stopping execution of a blue light filter in response to a user input.

Figure 14C:
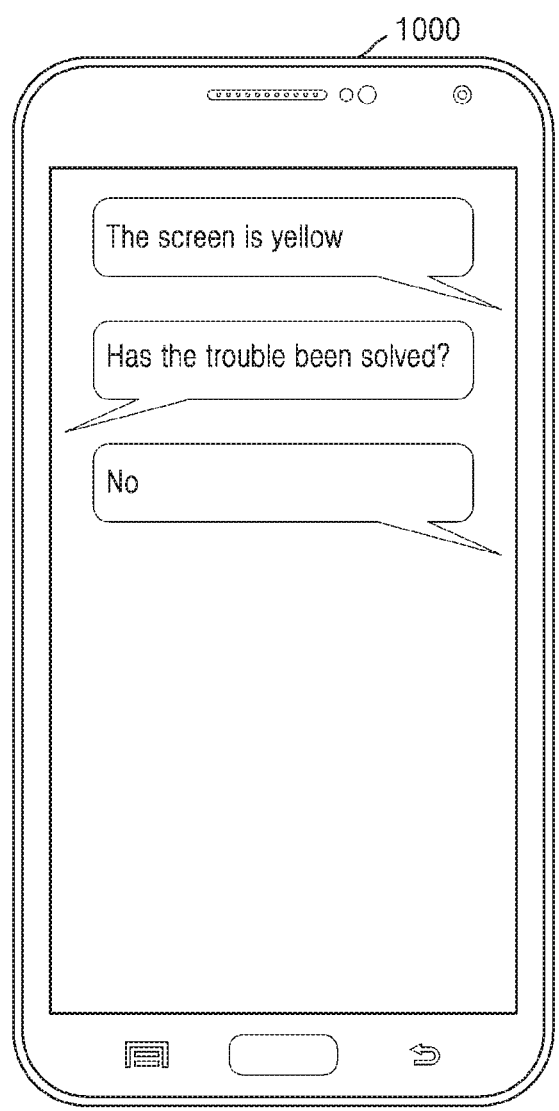

Referring to FIG. 14C, the device 1000 may output a confirmation message saying "Has the trouble been solved?" to check whether the trouble has been solved by executing the function 1411 of stopping execution of the blue light filter.

Figure 14D:
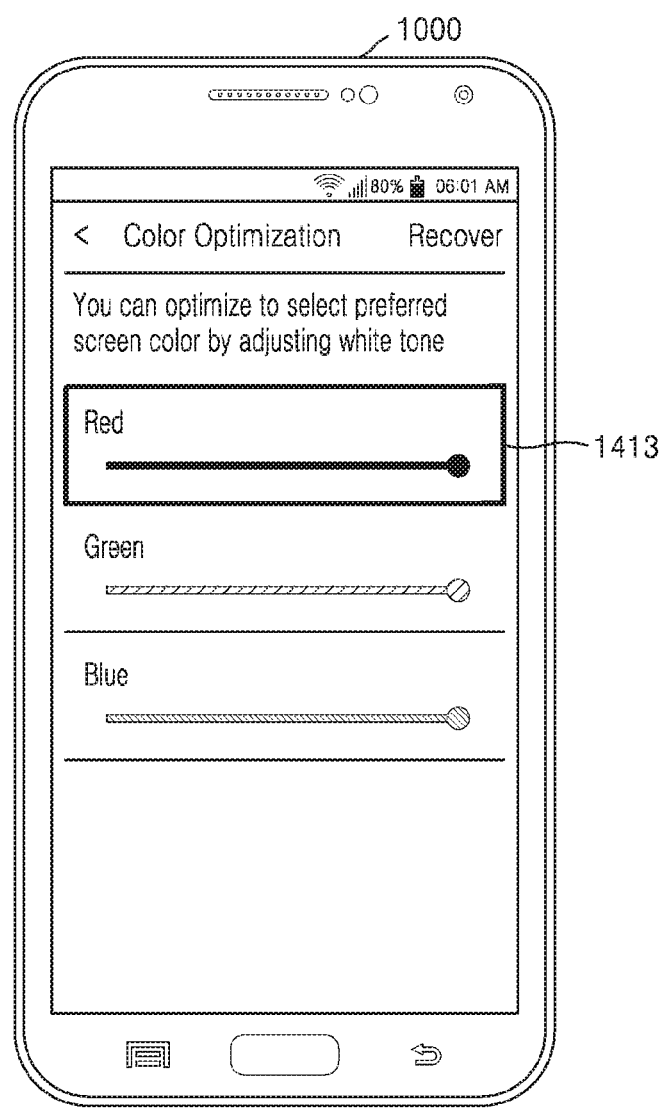

Referring to FIG. 14D, the device 1000 may execute a function 1413 of adjusting a screen color to a cool color in Full Screen Color Optimization based on a user input with respect to the confirmation message.

Figure 14E:
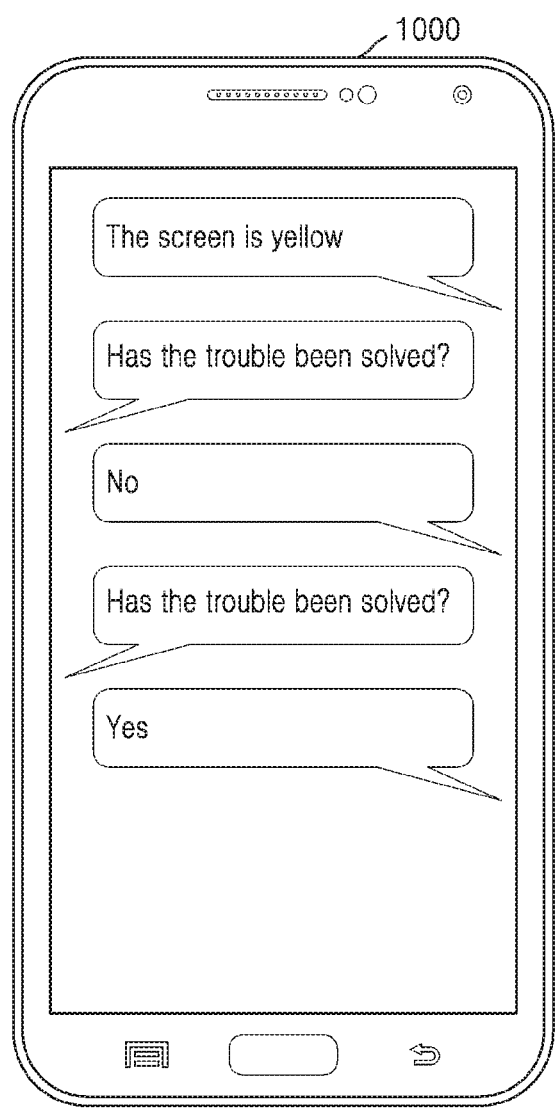

Referring to FIG. 14E, the device 1000 may output a confirmation message saying "Has the trouble been solved?" to check whether the trouble has been solved by executing the function 1413 of adjusting a screen color to a cool color.

FIGS. 15A through 15J are views illustrating an example in which the device 1000 sequentially provides operation guides corresponding to an inquiry about trouble occurring in the device 1000, according to one or more embodiments.

Figure 15A:
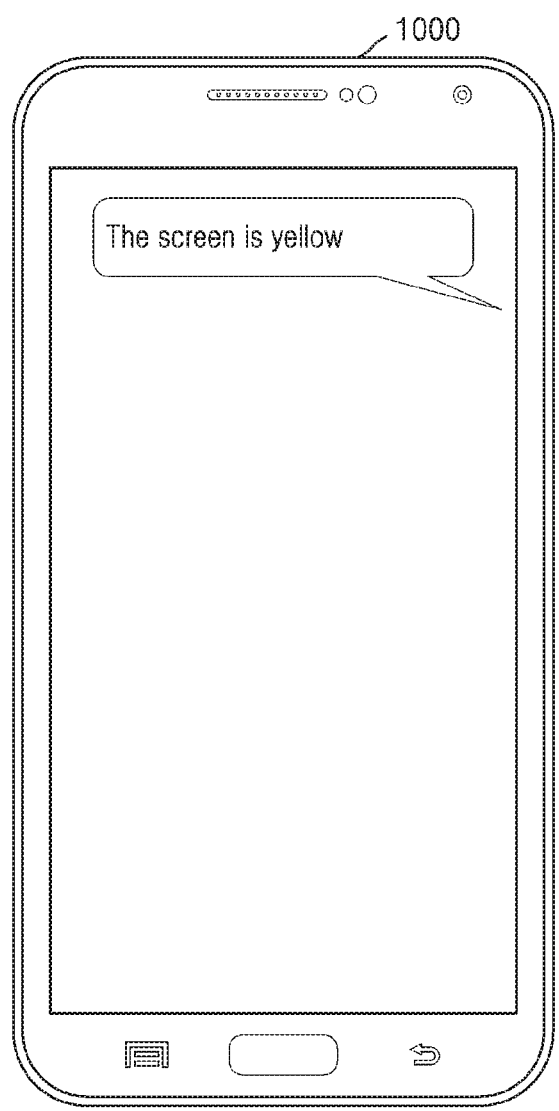
FIGS. 15A through 15J are views illustrating an example in which the device sequentially provides operation guides corresponding to an inquiry about trouble occurring in the device, according to one or more embodiments.

Referring to FIG. 15A, the device 1000 may extract operation scenario information for providing an operation guide based on a result obtained by classifying a device usage inquiry as an inquiry about trouble occurring in a display module. For example, the device 1000 may receive a user input for a device usage inquiry saying "The screen is yellow." The device 1000 may provide an operation guide that helps a user to execute a function corresponding to trouble occurring in the device 1000 based on information about detailed response operations included in the operation scenario information.

Figure 15B:
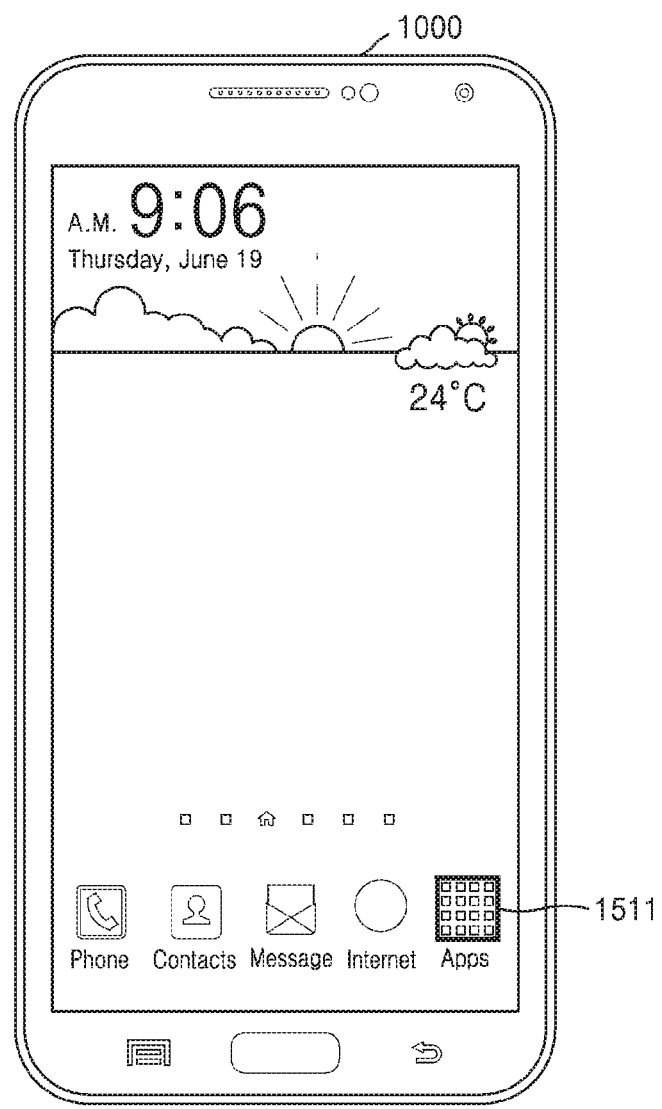

Referring to FIG. 15B, the device 1000 may provide an operation guide 1511 that selects Apps to select a settings application on a home screen. The device 1000 may execute an application drawer based on a user input corresponding to the provided operation guide 1511.

Figure 15C:
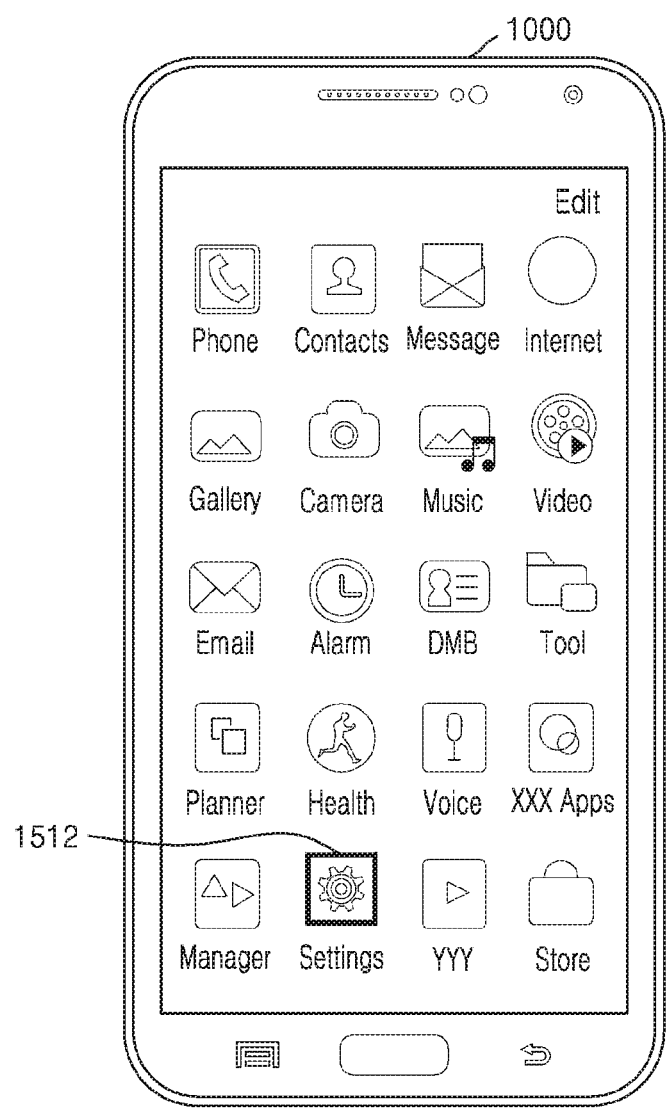

Referring to FIG. 15C, the device 1000 may provide an operation guide 1512 that selects the settings application in response to the received user input. The device 1000 may execute the settings application based on a user input corresponding to the provided operation guide 1512.

Figure 15D:
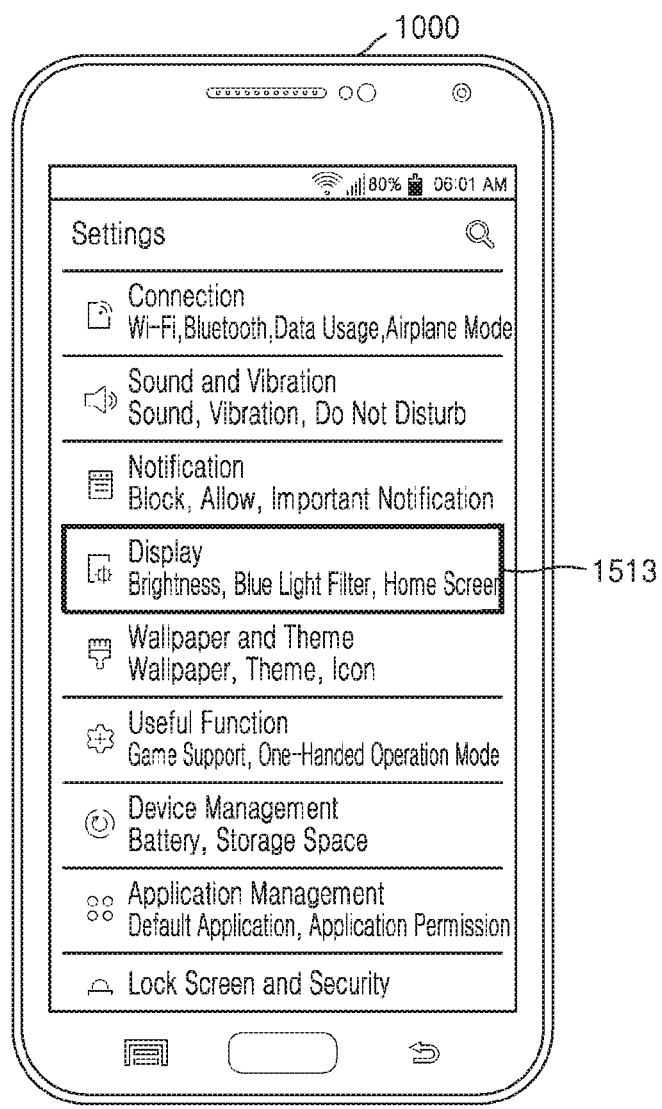

Referring to FIG. 15D, the device 1000 may provide an operation guide 1513 that helps the user to select a category of adjusting a display in the executed settings application. The device 1000 may execute a function of adjusting a display based on a user input corresponding to the provided operation guide 1513.

Figure 15E:
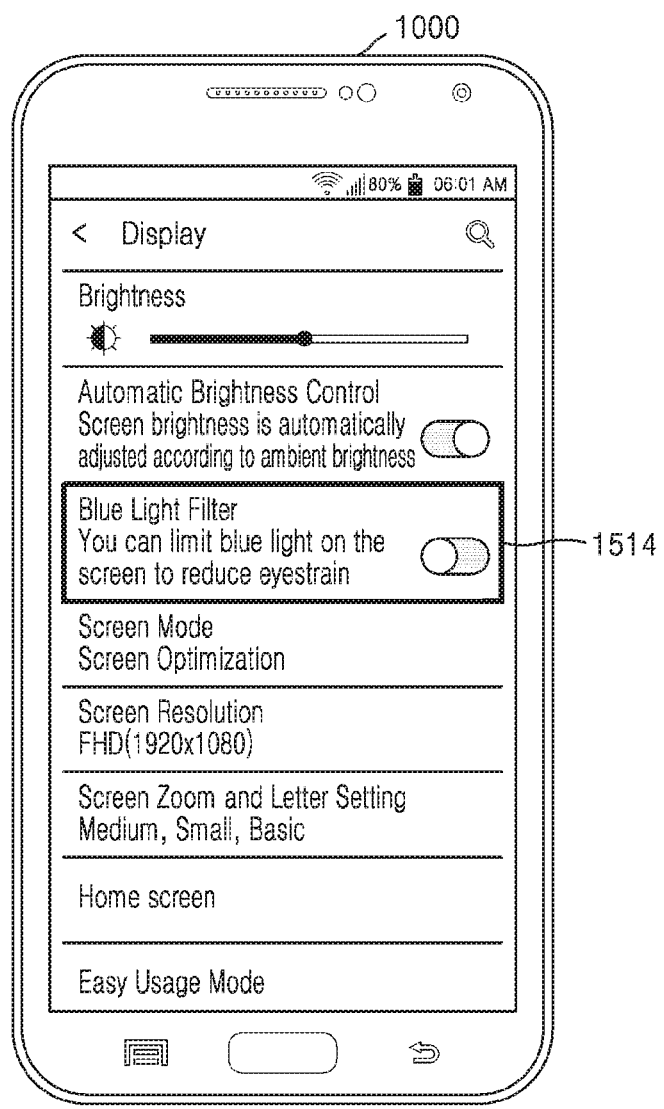

Referring to FIG. 15E, the device 1000 may provide an operation guide 1514 that informs the user about a function of stopping execution of a blue light filter in the category of adjusting a display. The device 1000 may execute the function of stopping execution of the blue light filter based on a user input corresponding to the provided operation guide 1514.

Figure 15F:
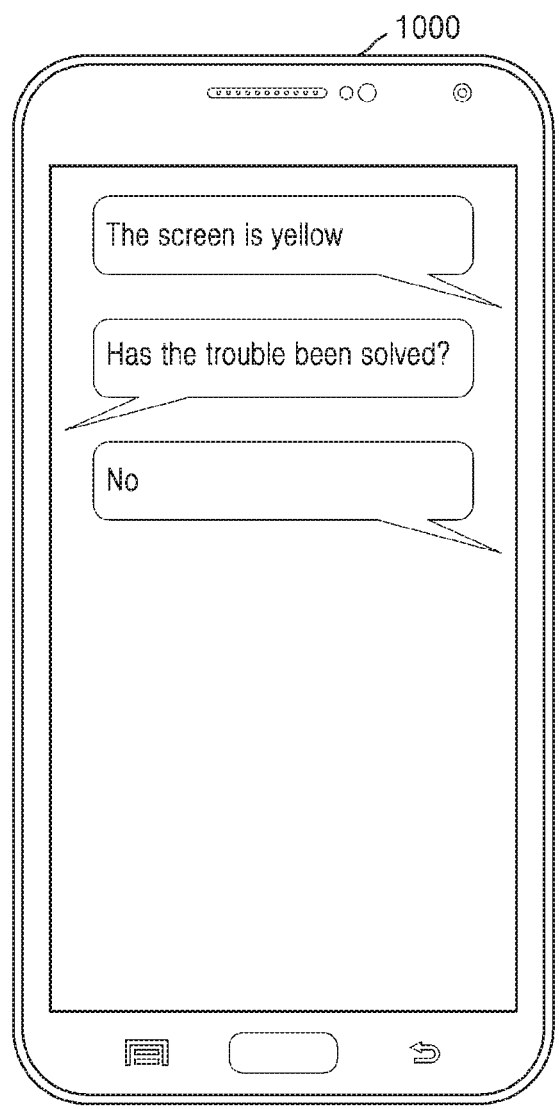

Referring to FIG. 15F, the device 1000 may output a confirmation message saying "Has the trouble been solved?" to check whether trouble has been solved by executing the function of stopping execution of the blue light filter.

Figure 15G:
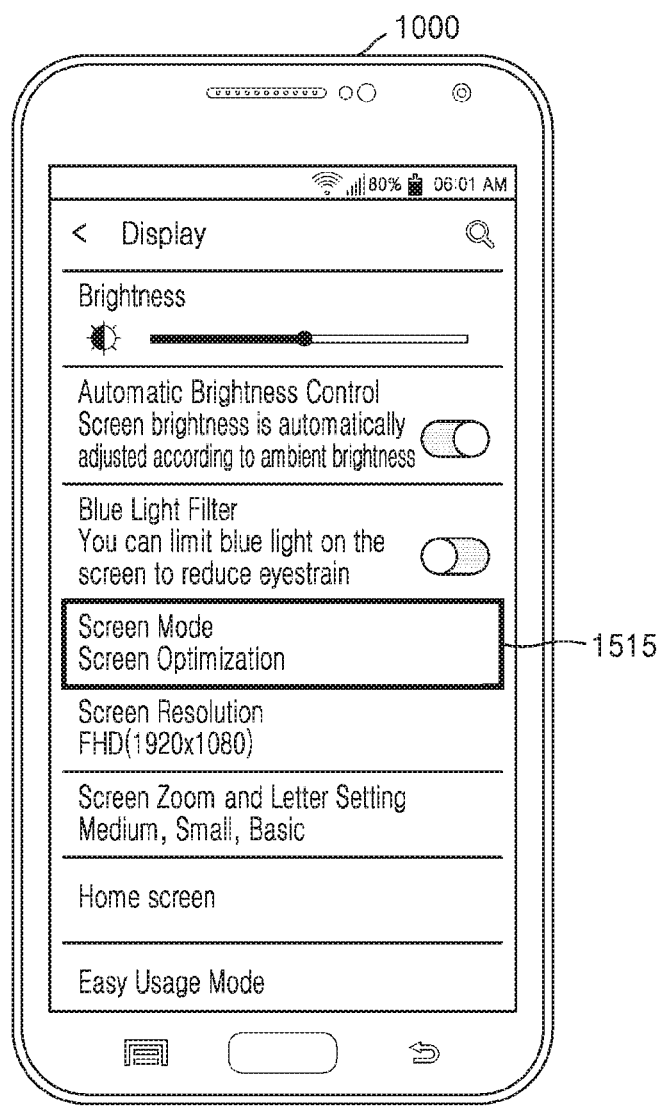

Referring to FIG. 15G, the device 1000 may provide an operation guide 1515 that helps the user to select a category of optimizing a screen in the category of adjusting a display. The device 1000 may execute a function of optimizing a screen based on a user input corresponding to the provided operation guide 1515.

Figure 15H:
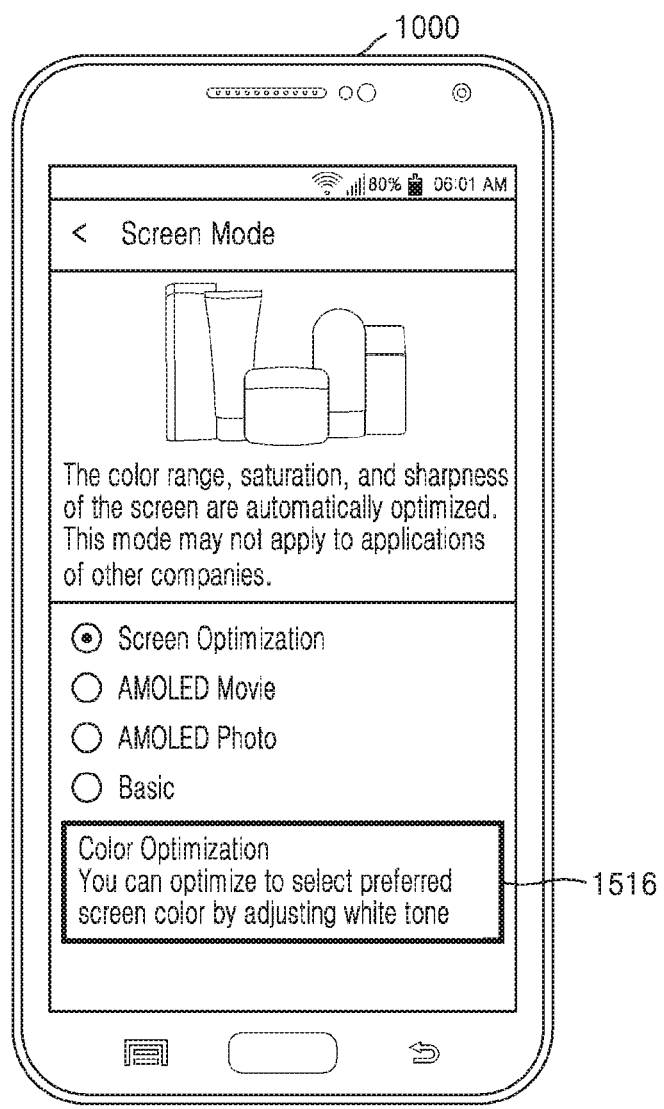

Referring to FIG. 15H, the device 1000 may provide an operation guide 1516 that helps the user to select a function of optimizing a color in the category of optimizing a screen. The device 1000 may execute the function of optimizing a color based on a user input corresponding to the provided operation guide 1516.

Figure 15I:
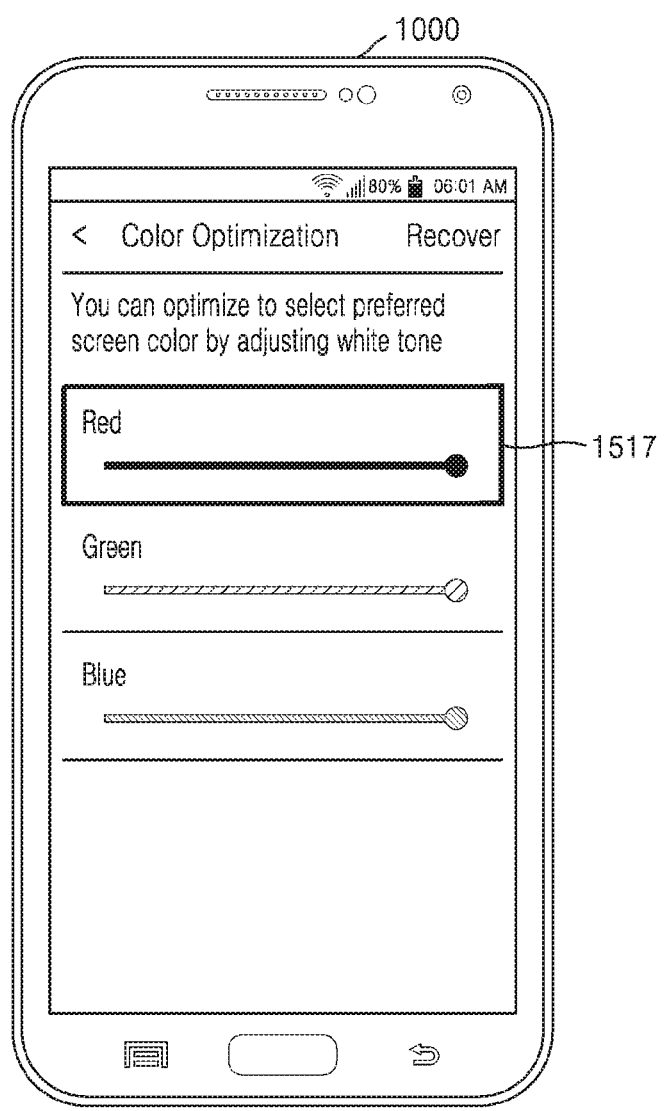

Referring to FIG. 15I, the device 1000 may provide an operation guide 1517 that informs the user about a function of adjusting a screen color to a cool color in the function of optimizing a color. The device 1000 may execute the function of adjusting a screen color to a cool color based on a user input corresponding to the provided operation guide 1517.

Figure 15J:
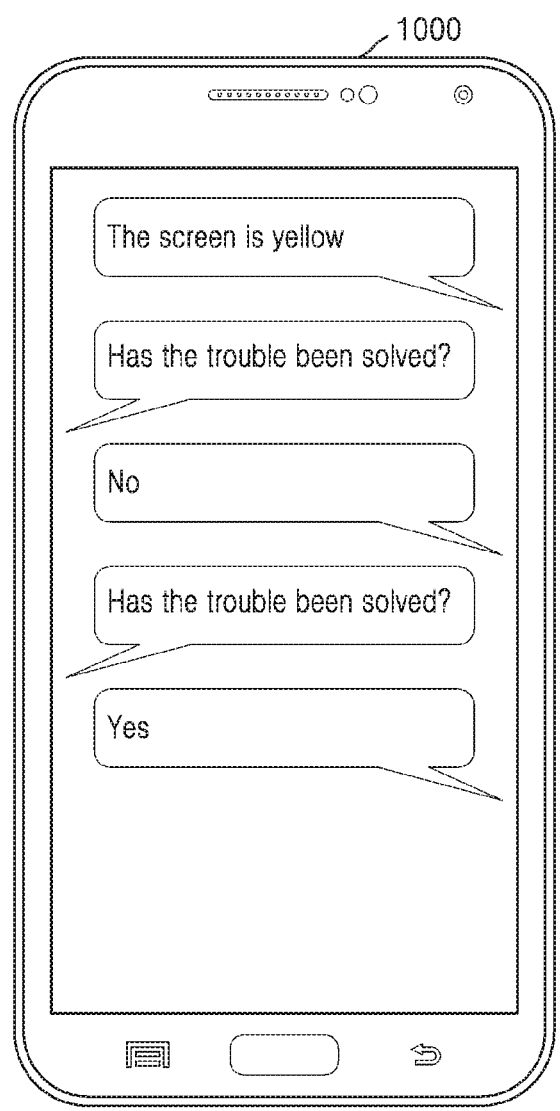

Referring to FIG. 15J, the device 1000 may output a confirmation message saying "Has the trouble been solved?" to check whether the trouble has been solved by executing the function of adjusting a screen color to a cool color.

Figure 16:
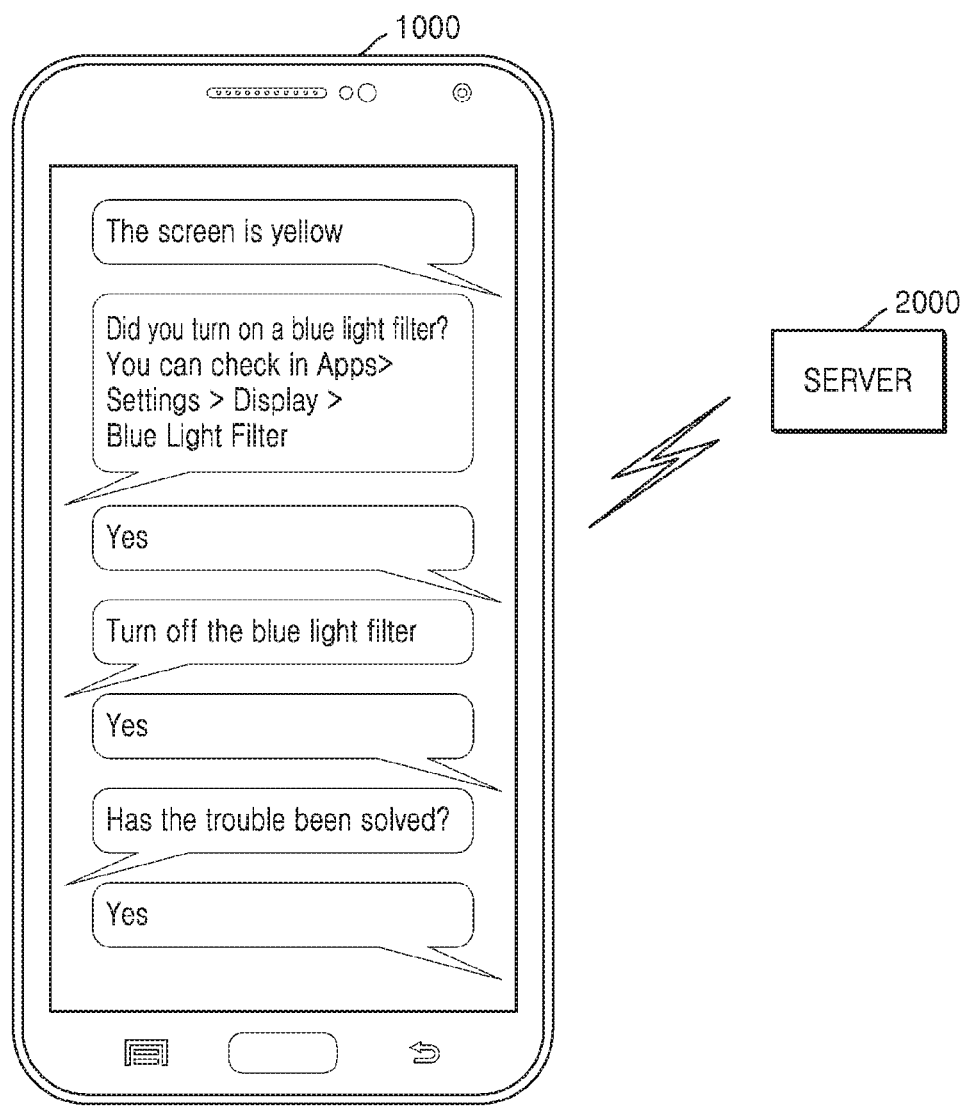
FIG. 16 is a view illustrating an example in which the device provides a response operation to a user input of a device usage inquiry by interoperating with a server, according to one or more embodiments.

FIG. 16 is a view illustrating an example in which the device 1000 provides a response operation to a user input of a device usage inquiry by interoperating with a server 2000.

Referring to FIG. 16, the device 1000 may be connected to the server 2000 through a network and may provide a reply message to a user's voice input by using data learned according to a standard preset by the server 2000.

In this case, the server 2000 may perform at least one function from among a function of classifying a device usage inquiry to meet a user's intention related to the device usage inquiry, a function of extracting operation scenario information for providing a response operation corresponding to a classification result, and a function of determining a recommendation operation for solving trouble occurring in the device 1000, which are performed by the device 1000 of FIGS. 1 through 15J.

In this case, the device 1000 and the server 2000 may transmit/receive data used to perform their functions. For example, the device 1000 may provide data used for a function performed by the server 2000 to the server 2000, and the device 1000 may receive result data generated according to the function performed by the server 2000 from the server 2000. Also, the server 2000 may provide data used for a function performed by the device 1000 to the device 1000, and the server 2000 may receive result data generated according to the function performed by the device 1000 from the device 1000.

Also, the server 2000 may manage at least one data from among data used to classify a device usage inquiry, data used to extract operation scenario information for providing a response operation corresponding to a classification result, and data used to determine a recommendation operation for solving trouble occurring in the device 1000.

Figure 17:
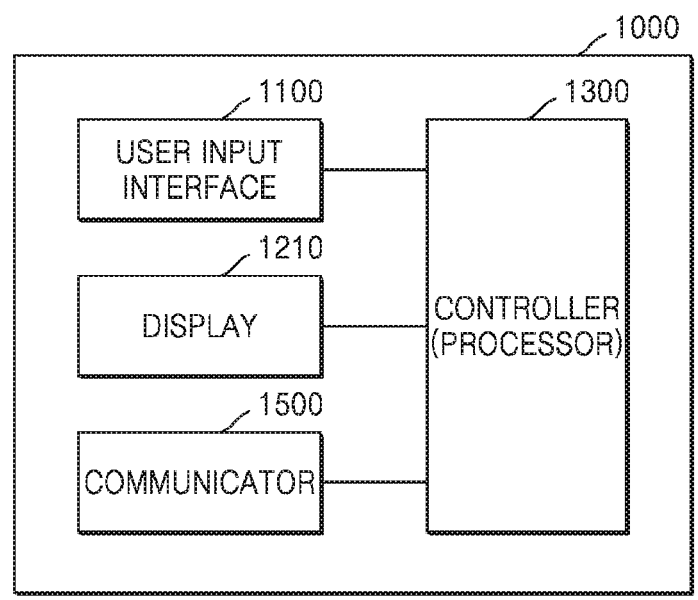
FIGS. 17 and 18 are block diagrams of the device according to one or more embodiments.
Figure 18:
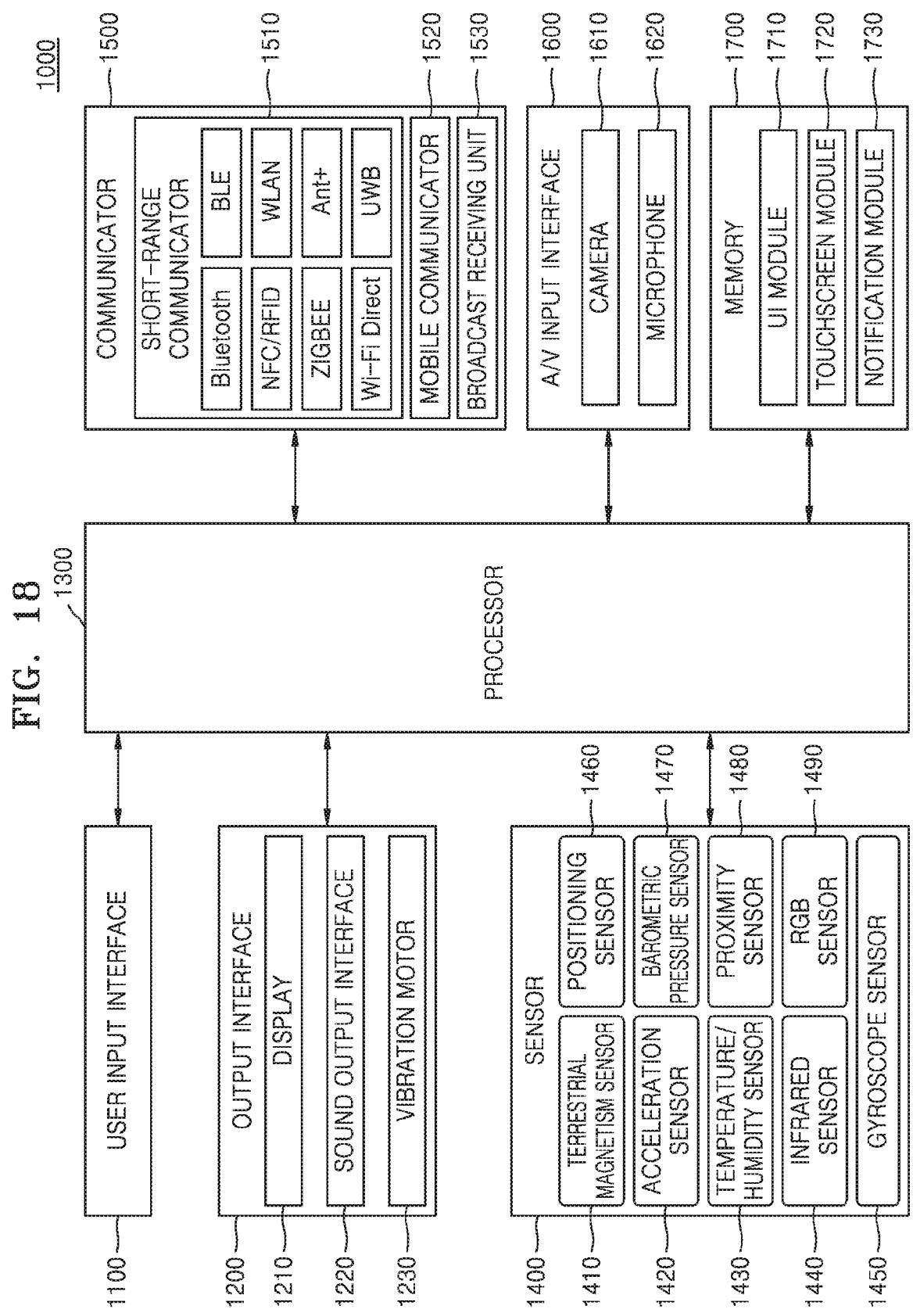

FIGS. 17 and 18 are block diagrams of the device 1000 according to one or more embodiments.

As shown in FIG. 17, the device 1000 according to one or more embodiments may include a user input interface 1100, a display 1210, a processor 1300, and a communicator 1500. However, all elements illustrated in FIG. 17 are not essential elements of the device 1000. The device 1000 may include more or less elements than the elements illustrated in FIG. 17.

For example, as shown in FIG. 18, the device 1000 according to one or more embodiments may include a sensor 1400, an audio/video (A/V) input interface 1600, and a memory 1700 in addition to the user input interface 1100, the output interface 1200, the processor 1300, and the communicator 1500.

The user input interface 1100 is a unit through which a user inputs data for controlling the device 1000. Examples of the user input interface 1100 may include, but are not limited to, a keypad, a dome switch, a touchpad (e.g., a contact-type capacitance method, a pressure-type resistance film method, an infrared sensing method, a surface ultrasound transmission method, an integral tension measuring method, or a piezoelectric effect method), a jog wheel, and a jug switch.

The user input interface 1100 may request for a reply message to a user input and may receive a user input for executing an operation related to the reply message.

The output interface 1200 may output an audio signal, a video signal, or a vibration signal, and may include a display 1210, a sound output interface 1220, and a vibration motor 1230.

The display 1210 displays and outputs information processed by the device 1000. For example, the display 1210 may display a user interface for requesting for a reply message to a user input and executing an operation related to the reply message.

The sound output interface 1220 may include a speaker and outputs audio data received from the communicator 1500 or stored in the memory 1700. Also, the sound output interface 1220 outputs a sound signal (e.g., a call signal receiving sound, a message receiving sound, or a notification sound) related to a function performed by the device 1000.

The processor 1300 generally controls an overall operation of the device 1000. For example, the processor 1300 may control the user input interface 1100, the output interface 1200, the sensor 1400, the communicator 1500, and the A/V input interface 1600 by executing programs stored in the memory 1700. Also, the processor 1300 may perform a function of the device 1000 of FIGS. 1 through 16 by executing programs stored in the memory 1700.

In detail, the processor 1300 may control the user input interface 1100 to receive text, image, and video inputs of a user. The processor 1300 may control a microphone 1620 to receive a voice input of the user. The processor 1300 may execute an application that performs an operation of the device 1000 based on a user input, and may control a user input to be received through the executed application. For example, the processor 1300 may execute a voice assistant application, and may control a voice input of the user to be received through the microphone 1620 by controlling the executed voice assistant application.

The processor 1300 may classify a device usage inquiry by applying a received user input of the device usage inquiry to a learning model. The processor 1300 may classify the device usage inquiry by inputting the received user input of the device usage inquiry to the learning model that is pre-generated. For example, the processor 1300 may determine whether the device usage inquiry is an inquiry about a method of using the device 1000 or an inquiry about a method of solving trouble occurring in the device 1000 by inputting the user input to the learning model that is pre-generated. In detail, the processor 1300 may classify the device usage inquiry according to information indicating that the device usage inquiry corresponds to an inquiry about a method of using which function from among functions executed by the device 1000. The processor 1300 may classify the device usage inquiry according to information indicating that the device usage inquiry corresponds to trouble occurring in which function from among the functions executed by the device 1000. The processor 1300 may classify the device usage inquiry according to information indicating that the device usage inquiry corresponds to trouble occurring in which module from among hardware modules of the device 1000.

According to an embodiment, the processor 1300 may classify the device usage inquiry by analyzing the user input by using any one or any combination of specification information of the device 1000, state information of the device 1000, state information of the user who uses the device 1000, and device usage history information of the user.

The processor 1300 may control detailed response operations corresponding to the received user input of the device usage inquiry to be executed by the device 1000. For example, the processor 1300 may control the detailed response operations to be executed by the device 1000 based on extracted operation scenario information. The processor 1300 may control the detailed response operations to be executed by the device 1000 based on any one or any combination of information about detailed response operations included in the extracted operation scenario information and information about an execution order of the detailed response operations.

The processor 1300 may control the device 1000 to provide a reply as a detailed response operation. The processor 1300 may control the device 1000 to execute a function of the device 1000 as a detailed response operation. The processor 1300 may control the display 1210 to output an operation guide for executing a function of the device 1000 as a detailed response operation.

According to an embodiment, the processor 1300 may control the display 1210 to output a reply message corresponding to the device usage inquiry as text. As another example, the processor 1300 may control the display 1210 to output a reply corresponding to the device usage inquiry as an image or a video. As another example, the processor 1300 may control the sound output interface 1220 to output a reply corresponding to the device usage inquiry as a sound.

According to an embodiment, the processor 1300 may control the device 1000 to execute a function for solving trouble with respect to an inquiry about trouble occurring in a function executed by the device 1000. For example, with respect to an inquiry about trouble occurring in a function executed by the device 1000 such as a function of making a call, a function of sending text, a function of transferring a file, a function of taking a photo and a video, a function of watching a photo and a video, a function of listening to music, a function of doing a search, a function of connecting to a peripheral device, or a function of sending money, the processor 1300 may control the device 1000 to end a process related to the function executed by the device 1000 and re-execute the function having the trouble.

According to an embodiment, with respect to an inquiry about trouble occurring in a hardware module of the device 1000, the processor 1300 may control the device 1000 to execute a function for trouble shooting. For example, the processor 1300 may control the device 1000 to execute a function of solving trouble occurring in a hardware module of the device 1000 such as a battery, a display, a phone, a communication module such as the Internet or Bluetooth, a volume controller, a camera, or a biometric sensor.

According to an embodiment, with respect to an inquiry about a method of using a function executed by the device 1000, the processor 1300 may control the display 1210 to output an operation guide that helps the user to execute the function. For example, the processor 1300 may control the display 1210 to output an operation guide that helps the user to use a function executed by the device 1000 such as a function of making a call, a function of sending text, a function of transferring a file, a function of taking a photo and a video, a function of watching a photo and a video, a function of listening to music, a function of doing a search, a function of connecting to a peripheral device, or a function of sending money.

According to an embodiment, with respect to an inquiry about trouble occurring in a function executed by the device 1000, the processor 1300 may control the display 1210 to output an operation guide that helps the user to execute a function for trouble shooting as a detailed response operation. For example, with respect to an inquiry about trouble occurring in a function executed by the device 1000 such as a function of making a call, a function of sending text, a function of transferring a file, a function of taking a photo and a video, a function of watching a photo and a video, a function of listening to music, a function of doing a search, a function of connecting to a peripheral device, or a function of sending money, the processor 1300 may control the display 1210 to output an operation guide that helps the user to use a function for trouble shooting.

According to an embodiment, with respect to an inquiry about trouble occurring in a hardware module of the device 1000, the processor 1300 may control the display 1210 to output an operation guide that helps the user to use a function for trouble shooting. For example, the processor 1300 may control the display 1210 to output an operation guide that helps the user to use a function for solving trouble occurring in a hardware module of the device 1000 such as a battery, a display, a phone, a communication module such as the Internet or Bluetooth, a volume controller, a camera, or a biometric sensor.

According to an embodiment, the processor 1300 may control the device 1000 to sequentially execute detailed response operations corresponding to a user input based on information about an execution order of detailed response operations included in extracted operation scenario information.

According to an embodiment, the processor 1300 may control the display 1210 to output a confirmation message for checking whether trouble occurring in the device 1000 has been solved. The processor 1300 may control a user input with respect to the confirmation message to be received through the user input interface 1100. The processor 1300 may determine an additional recommendation operation for solving trouble based on the user input with respect to the confirmation message. The processor 1300 may control the device 1000 to execute a detailed response operation corresponding to the determined additional recommendation operation. For example, the processor 1300 may control the device 1000 to execute a detailed response operation that is not executed yet based on the information about the execution order of the detailed response operations included in the operation scenario information.

Also, the processor 1300 may classify the device usage inquiry by using a data recognition model stored in the memory 1700 or the server 2000 and may provide a response operation corresponding to a classification result, which will be described below in more detail with reference to FIGS. 20 through 23.

Also, the processor 1300 may efficiently learn a standard for classifying a device usage inquiry by using the data recognition model stored in the memory 1700 or the server 2000 and providing a response operation corresponding to a classification result, and may provide a service meeting the user's intention to the user.

The sensor 1400 may detect a state of the device 1000 or a state around the device 1000, and may transmit information about the state to the processor 1300. The sensor 1400 may be used to generate a part of specification information of the device 1000, state information of the device 1000, ambient environment information of the device 1000, state information of the user, and device usage history information of the user.

The sensor 1400 may include, but is not limited to, any one or any combination of a terrestrial magnetism sensor 1410, an acceleration sensor 1420, a temperature/humidity sensor 1430, an infrared sensor 1440, a gyroscope sensor 1450, a positioning sensor (e.g., a GPS) 1460, a barometric pressure sensor 1470, a proximity sensor 1480, and an RGB sensor (e.g., an illuminance sensor) 1490. Functions of the sensors would have been intuitively derived by one of ordinary skill in the art from their names, and thus a detailed explanation thereof will not be given.

The communicator 1500 may include one or more elements through which the device 1000 communicates with another device and the server 2000. The other device may be, but is not limited to, a computing device or a sensing device, like the device 1000. For example, the communicator 1500 may include a short-range communicator 1510, a mobile communicator 1520, and a broadcast receiver 1530.

Examples of the short-range communicator 1510 may include, but are not limited to, a Bluetooth communicator, a Bluetooth low energy (BLE) communicator, a near-field communicator, a WLAN (Wi-Fi) communicator, a Zigbee communicator, an infrared data association (IrDA) communicator, a Wi-Fi Direct (WFD) communicator, an ultra-wideband (UWB) communicator, and an Ant+ communicator.

The mobile communicator 1520 transmits/receives a wireless signal to/from any one or any combination of a base station, an external terminal, and a server via a mobile communication network. Examples of the wireless signal may include a voice call signal, a video call signal, and any of various pieces of data according to text/multimedia message transmission/reception.

The broadcast receiver 1530 receives a broadcast signal and/or broadcast-related information from the outside through a broadcast channel. Examples of the broadcast channel may include a satellite channel and a terrestrial channel. According to an embodiment, the device 1000 may not include the broadcast receiver 1530.

Also, the communicator 1500 may transmit/receive information used to request for a reply message to the user's voice input and execute an operation related to the reply message to/from the server 2000 and the other device.

The A/V input interface 1600 for receiving an audio signal input or a video signal input may include a camera 1610 and the microphone 1620. The camera 1610 may obtain image frames such as a still image or a moving image by using an image sensor in a video call mode or an imaging mode. An image captured through the image sensor may be processed by the processor 1300 or an additional image processor. An image captured by the camera 1610 may be used as context information of the user.

The microphone 1620 receives an external sound signal and processes the external sound signal into electrical voice data. For example, the microphone 1620 may receive a sound signal from an external device or the user. The microphone 1620 may receive the user's voice input. The microphone 1620 may use any of various noise removing algorithms to remove noise occurring when receiving the external sound signal.

The memory 1700 may store a program for processing and controlling the processor 1300, and may store data input to the device 1000 or output from the device 1000.

The memory 1700 may include at least one type of storage medium from among a flash memory type, a hard disk type, a multimedia card micro type, a card-type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Programs stored in the memory 1700 may be classified into a plurality of modules according to functions of the memory 1700. For example, the memory 1700 may include a user interface (UI) module 1710, a touchscreen module 1720, and a notification module 1730.

The UI module 1710 may provide a specialized UI or a graphical user interface (GUI) that interoperates with the device 1000 according to an application. The touchscreen module 1720 may detect a touch gesture on a touchscreen of the user, and may transmit information about the touch gesture to the processor 1300. The touchscreen module 1720 according to one or more embodiments may recognize and analyze a touch code. The touchscreen module 1720 may be configured as separate hardware including a controller.

The notification module 1730 may generate a signal for notifying an event occurring in the device 1000. Examples of the event occurring in the device 1000 may include call signal reception, message reception, key signal input, and schedule notification. The notification module 1730 may output a notification signal as a video signal through the display 1210, may output a notification signal as an audio signal through the sound output interface 1220, or may output a notification signal as a vibration signal through the vibration motor 1230.

Figure 19:
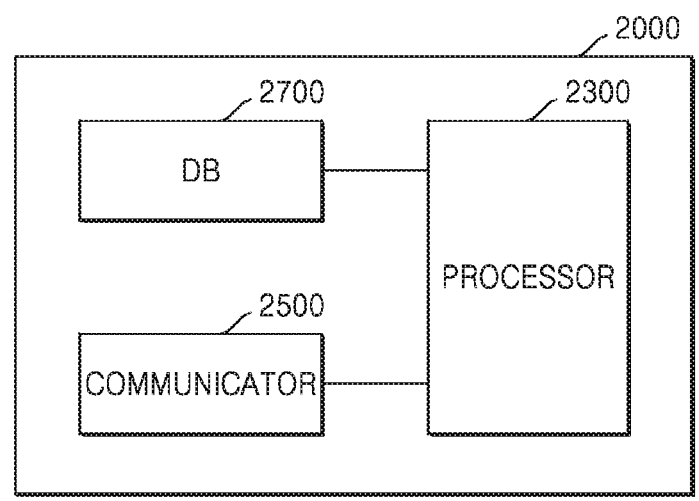
FIG. 19 is a block diagram of the server according to one or more embodiments.

FIG. 19 is a block diagram of the server 2000 according to one or more embodiments.

Referring to FIG. 19, the server 2000 according to one or more embodiments may include a communicator 2500, a DB 2700, and a processor 2300.

The communicator 2500 may include one or more elements for communicating with the device 1000.

The DB 2700 may store data for authenticating a vehicle plate number-based payment.

The processor 2300 generally controls an overall operation of the server 2000. For example, the processor 2300 may control the DB 2700 and the communicator 2500 by executing programs stored in the DB 2700 of the server 2000. The processor 2300 may perform some operations of the device 1000 of FIGS. 1 through 15J by executing programs stored in the DB 2700.

The processor 2300 may perform any one or any combination of a function of classifying a device usage inquiry, a function of extracting operation scenario information for providing a response operation corresponding to a classification result, and a function of determining a recommendation operation for solving trouble occurring in the device 1000, which are performed by the device 1000 of FIGS. 1 through 15J.

Also, the processor 2300 may manage any one or any combination of data used to classify the device usage inquiry, data used to extract the operation scenario information for providing a response operation corresponding to a classification result, and data used to determine the recommendation operation for solving trouble occurring in the device 1000.

Figure 20:
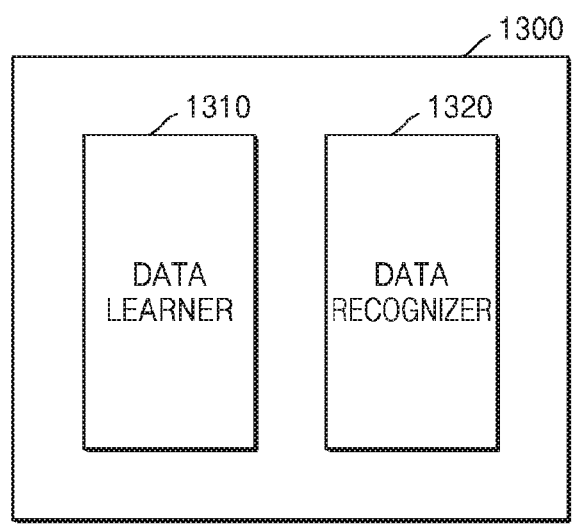
FIG. 20 is a block diagram of a processor according to one or more embodiments.

FIG. 20 is a block diagram of the processor 1300 according to one or more embodiments.

Referring to FIG. 20, the processor 1300 according to one or more embodiments may include a data learner 1310 and a data recognizer 1320.

The data learner 1310 may learn a standard for classifying a device usage inquiry and providing a response operation corresponding to a classification result. The data learner 1310 may learn a standard about which data is to be used in order to classify a device usage inquiry and provide a response operation corresponding to a classification result. Also, the data learner 1310 may learn a standard about how to classify a device usage inquiry and how to provide a response operation corresponding to a classification result. The data learner 1310 may obtain data to be used for learning, and may learn a standard for classifying a device usage inquiry by applying the obtained data to a data recognition model that will be described below and providing a response operation corresponding to a classification result.

The data recognizer 1320 may classify a device usage inquiry based on data, and may provide a response operation corresponding to a classification result. The data recognizer 1320 may classify a device usage inquiry from predetermined data by using the trained data recognition model, and may provide a response operation corresponding to a classification result. The data recognizer 1320 may obtain predetermined data according to a standard that is pre-set by learning, and may use the data recognition model by using the obtained predetermined data as an input value. Also, in this case, the data recognizer 1320 may classify a device usage inquiry based on the predetermined data, and may provide a response operation corresponding to a classification result. Also, a result value output by the data recognition model by using the obtained predetermined data as an input value may be used to refine the data recognition model.

Either one or both of the data learner 1310 and the data recognizer 1320 may be manufactured as at least one hardware chip and may be mounted on an electronic apparatus. For example, either one or both of the data learner 1310 and the data recognizer 1320 may be manufactured as a dedicated hardware chip for artificial intelligence (AI), or may be manufactured as a part of an existing general-purpose processor (e.g., a central processing unit (CPU) or an application processor) or a graphics processor (e.g., a graphics processing unit (GPU)) and may be mounted on any of various electronic apparatuses.

In this case, the data learner 1310 and the data recognizer 1320 may be mounted on one electronic apparatus, or may be separately mounted on electronic apparatuses. For example, one of the data learner 1310 and the data recognizer 1320 may be included in an electronic apparatus, and the remaining one may be included in a server. Also, model information established by the data learner 1310 may be provided to the data recognizer 1320 and data input to the data recognizer 1320 may be provided as additional learning data to the data learner 1310 by wire or wirelessly.

Either one or both of the data learner 1310 and the data recognizer 1320 may be implemented as a software module. When either one or both of the data learner 1310 and the data recognizer 1320 is implemented as a software module (or a program module including instructions), the software module may be stored in a non-transitory computer-readable recording medium. Also, in this case, at least one software module may be provided by an OS or a predetermined application. Alternatively, a part of at least one software module may be provided by an OS, and the remaining part may be provided by a predetermined application.

Figure 21:
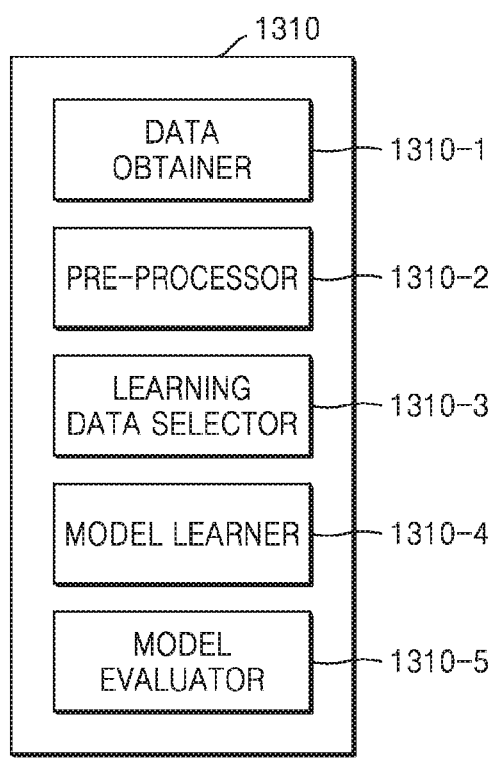
FIG. 21 is a block diagram of a data learner according to one or more embodiments.

FIG. 21 is a block diagram of the data learner 1310 according to one or more embodiments.

Referring to FIG. 21, the data learner 1310 according to one or more embodiments may include a data obtainer 1310-1, a pre-processor 1310-2, a learning data selector 1310-3, a model learner 1310-4, and a model evaluator 1310-5.

The data obtainer 1310-1 may obtain data used to classify a device usage inquiry and provide a response operation corresponding to a classification result. The data obtainer 1310-1 may obtain, for example, a user input for a predetermined device usage inquiry, a classification result of the predetermined device usage inquiry, specification information of the device 1000, state information of the device 1000, ambient environment information of the device 1000, state information of a user who uses the device 1000, and device usage history information of the user.

The pre-processor 1310-2 may pre-process the obtained data so that the obtained data is used for learning for classifying a device usage inquiry and providing a response operation corresponding to a classification result. The pre-processor 1310-2 may process the obtained data into a preset format so that the model learner 1310-4 that will be described below may use the obtained data for learning for classifying a device usage inquiry and providing a response operation corresponding to a classification result.

The learning data selector 1310-3 may select data used for learning from among pieces of pre-processed data. The selected data may be provided to the model learner 1310-4. The learning data selector 1310-3 may select data used for learning from among the pieces of pre-processed data, according to a preset standard for classifying a device usage inquiry and providing a response operation corresponding to a classification result. Also, the learning data selector 1310-3 may select data according to a standard preset by learning by the model learner 1310-4 that will be described below.

The model learner 1310-4 may learn a standard about how to classify a device usage inquiry based on learning data and how to provide a response operation corresponding to a classification result. Also, the model learner 1310-4 may learn a standard about which learning data is to be used in order to classify a device usage inquiry and provide a response operation corresponding to a classification result.

Also, the model learner 1310-4 may train a data recognition model used to classify a device usage inquiry and provide a response operation corresponding to a classification result by using learning data. In this case, the data recognition model may be a model that is previously established. For example, the data recognition model may be a model that is previously established by receiving basic learning data (e.g., sample data).

The data recognition model may be established in consideration of a field to which a recognition model is applied, the purpose of learning, or the computer performance of the device 1000. The data recognition model may be a model based on, for example, a neural network. For example, a model such as a deep neural network (DNN), a recurrent neural network (RNN), or a bidirectional recurrent deep neural network (BRDNN) may be used as the data recognition model.

According to various embodiments, when a plurality of data recognition models that was previously established exist, the model learner 1310-4 may determine a data recognition model having a high relationship with input learning data and basic learning data as a data recognition model to be trained. In this case, the basic learning data may be previously classified according to types of data, and the data recognition models may be previously established according to the types of data. For example, the basic learning data may be previously classified according to various standards such as an area in which learning data is generated, a time for which the learning data is generated, a size of the learning data, a genre of the learning data, a generator of the learning data, and a type of an object in the learning data.

Also, the model learner 1310-4 may train the data recognition model by using a learning algorithm including, for example, error back-propagation or gradient descent.

Also, the model learner 1310-4 may train a data recognition model through supervised learning by using, for example, learning data as an input value. Also, the model learner 1310-4 may train the data recognition model through unsupervised learning to find a standard for classifying a device usage inquiry and providing a response operation corresponding to a classification result by learning a type of data used to classify a device usage inquiry and provide a response operation corresponding to a classification result by itself without supervision. Also, the model learner 1310-4 may train the data recognition model through reinforcement learning using a feedback about whether a result of classifying a device usage inquiry and providing a response operation corresponding to a classification result according to learning is right.

Also, when the data recognition model is trained, the model learner 1310-4 may store the trained data recognition model. In this case, the model learner 1310-4 may store the trained data recognition model in a memory of an electronic apparatus including the data recognizer 1320. Alternatively, the model learner 1310-4 may store the trained data recognition model in a memory of a server connected to the electronic apparatus through a wired or wireless network.

In this case, the memory in which the trained data recognition model is stored may also store, for example, a command or data related to at least another element of the electronic apparatus. Also, the memory may store software and/or a program. The program may include, for example, a kernel, middleware, an application programming interface (API), and/or an application program (or an application).

When the model evaluator 1310-5 inputs evaluation data to the data recognition model and a recognition result output from the evaluation data does not satisfy a predetermined standard, the model evaluator 1310-5 may cause the model learner 1310-4 to learn again. In this case, the evaluation data may be preset data for evaluating the data recognition model.

For example, from among recognition results of the trained data recognition model output from evaluation data, when the number or a ratio of recognition results that are not accurate exceeds a preset threshold value, it may be evaluated that the predetermined standard is not satisfied. For example, when 2% is defined as the predetermined standard and wrong recognition results are output from more than 20 pieces of evaluation data from among 1000 pieces of evaluation data, the model evaluator 1310-5 may evaluate that the trained data recognition model is not suitable.

When a plurality of trained data recognition models exist, the model evaluator 1310-5 may evaluate whether each of the trained recognition models satisfies a predetermined standard, and may determine a model satisfying the predetermined standard as a final data recognition model. In this case, when a plurality of models satisfy the predetermined standard, the model evaluator 1310-5 may determine one or a predetermined number of models that are preset in a descending order of evaluation scores as final data recognition models.

Any one or any combination of the data obtainer 1310-1, the pre-processor 1310-2, the learning data selector 1310-3, the model learner 1310-4, and the model evaluator 1310-5 in the data learner 1310 may be manufactured as at least one hardware chip and may be mounted on an electronic apparatus. For example, any one or any combination of the data learner 1310-4, the pre-processor 1310-2, the learning data selector 1310-3, the model learner 1310-4, and the model evaluator 1310-5 may be manufactured as a dedicated hardware chip for AI, or may be manufactured as a part of an existing general-purpose processor (e.g., a CPU or an application processor) or a graphics processor (e.g., a GPU), and may be mounted on any of various electronic apparatuses.

Also, the data obtainer 1310-1, the pre-processor 1310-2, the learning data selector 1310-3, the model learner 1310-4, and the model evaluator 1310-5 may be mounted on one electronic apparatus, or may be separately respectively mounted on electronic apparatuses. For example, some of the data obtainer 1310-1, the pre-processor 1310-2, the learning data selector 1310-3, the model learner 1310-4, and the model evaluator 1310-5 may be included in an electronic apparatus, and the remaining ones may be included in a server.

Also, any one or any combination of the data obtainer 1310-1, the pre-processor 1310-2, the learning data selector 1310-3, the model learner 1310-4, and the model evaluator 1310-5 may be implemented as a software module. When any one or any combination of the data obtainer 1310-1, the pre-processor 1310-2, the learning data selector 1310-3, the model learner 1310-4, and the model evaluator 1310-5 is implemented as a software module (or a program module including instructions), the software module may be stored in a non-transitory computer-readable recording medium. Also, in this case, at least one software module may be provided by an OS or a predetermined application. Alternatively, a part of at least one software module may be provided by an OS, and the remaining part may be provided by a predetermined application.

The processor 1300 may use various data recognition models, and may efficiently learn a standard for classifying a device usage inquiry by using any of various methods through a data recognition model and providing a response operation corresponding to a classification result.

Figure 22:
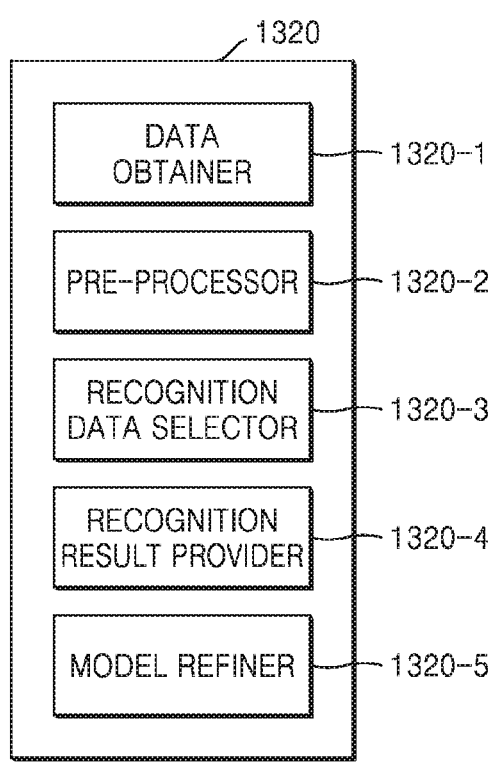
FIG. 22 is a block diagram of a data recognizer according to one or more embodiments.

FIG. 22 is a block diagram of the data recognizer 1320 according to one or more embodiments.

Referring to FIG. 22, the data recognizer 1320 according to one or more embodiments may include a data obtainer 1320-1, a pre-processor 1320-2, a recognition data selector 1320-3, a recognition result provider 1320-4, and a model refiner 1320-5.

The data obtainer 1320-1 may obtain data used to classify a device usage inquiry and provide a response operation corresponding to a classification result, and the pre-processor 1320-2 may pre-process the obtained data so that the data obtained to classify a device usage inquiry and provide a response operation corresponding to a classification result is used. The pre-processor 1320-2 may process the obtained data into a preset format so that the recognition result provider 1320-4 that will be described below may use the data obtained to classify a device usage inquiry and provide a response operation corresponding to a classification result.

For example, the data obtainer 1320-1 may obtain a user's voice input to the device 1000. Also, the data obtainer 1320-1 may obtain any one or any combination of specification information of the device 1000, state information of the device 1000, state information of the user who uses the device 1000, and device usage history information of the user which are received from an external device or generated by the device 1000.

The recognition data selector 1320-3 may select data used to classify a device usage inquiry from among pieces of pre-processed data and provide a response operation corresponding to a classification result. The selected data may be provided to the recognition result provider 1320-4. The recognition data selector 1320-3 may select some or all of the pieces of pre-processed data according to a preset standard for classifying a device usage inquiry and providing a response operation corresponding to a classification result. Also, the recognition data selector 1320-3 may select data according to a standard preset by learning by the model learner 1310-4 as described below.

The recognition result provider 1320-4 may classify a device usage inquiry by applying the selected data to a data recognition model, and may provide a response operation corresponding to a classification result. The recognition result provider 1320-4 may provide a recognition result according to recognition purpose of the data. The recognition result provider 1320-4 may apply the selected data to the data recognition model by using the data selected by the recognition data selector 1320-3 as an input value. Also, the recognition result may be determined by the data recognition model.

The model refiner 1320-5 may refine the data recognition model based on evaluation of the recognition result provided by the recognition result provider 1320-4. For example, the model refiner 1320-5 may provide the recognition result provided by the recognition result provider 1320-4 to the model learner 1310-4 so that the model learner 1310-4 refines the data recognition model.

Any one or any combination of the data obtainer 1320-1, the pre-processor 1320-2, the recognition data selector 1320-3, the recognition result provider 1320-4, and the model refiner 1320-5 in the data recognizer 1320 may be manufactured as at least one hardware chip and may be mounted on an electronic apparatus. For example, any one or any combination of the data obtainer 1320-1, the pre-processor 1320-2, the recognition data selector 1320-3, the recognition result provider 1320-4, and the model refiner 1320-5 may be manufactured as a dedicated hardware chip for AI, or may be manufactured as a part of an existing general-purpose processor (e.g., a CPU or an application processor) or a graphics processor (e.g., a GPU) and may be mounted on any of various electronic apparatuses.

Also, the data obtainer 1320-1, the pre-processor 1320-2, the recognition data selector 1320-3, the recognition result provider 1320-4, and the model refiner 1320-5 may be mounted on one electronic apparatus, or may be separately respectively mounted on electronic apparatuses. For example, some of the data obtainer 1320-1, the pre-processor 1320-2, the recognition data selector 1320-3, the recognition result provider 1320-4, and the model refiner 1320-5 may be included in an electronic apparatus, and the remaining others may be included in a server.

Also, any one or any combination of the data obtainer 1320-1, the pre-processor 1320-2, the recognition data selector 1320-3, the recognition result provider 1320-4, and the model refiner 1320-5 may be implemented as a software module. When any one or any combination of the data obtainer 1320-1, the pre-processor 1320-2, the recognition data selector 1320-3, the recognition result provider 1320-4, and the model refiner 1320-5 is implemented as a software module (or a program module including instructions), the software module may be stored in a non-transitory computer-readable recording medium. Also, in this case, at least one software module may be provided by an OS or a predetermined application. Alternatively, a part of at least one software module may be provided by an OS and the remaining part may be provided by a predetermined application.

Also, the device 1000 may provide a service that meets the user's intention to the user by using the data recognition model to which a learned result is applied.

Figure 23:
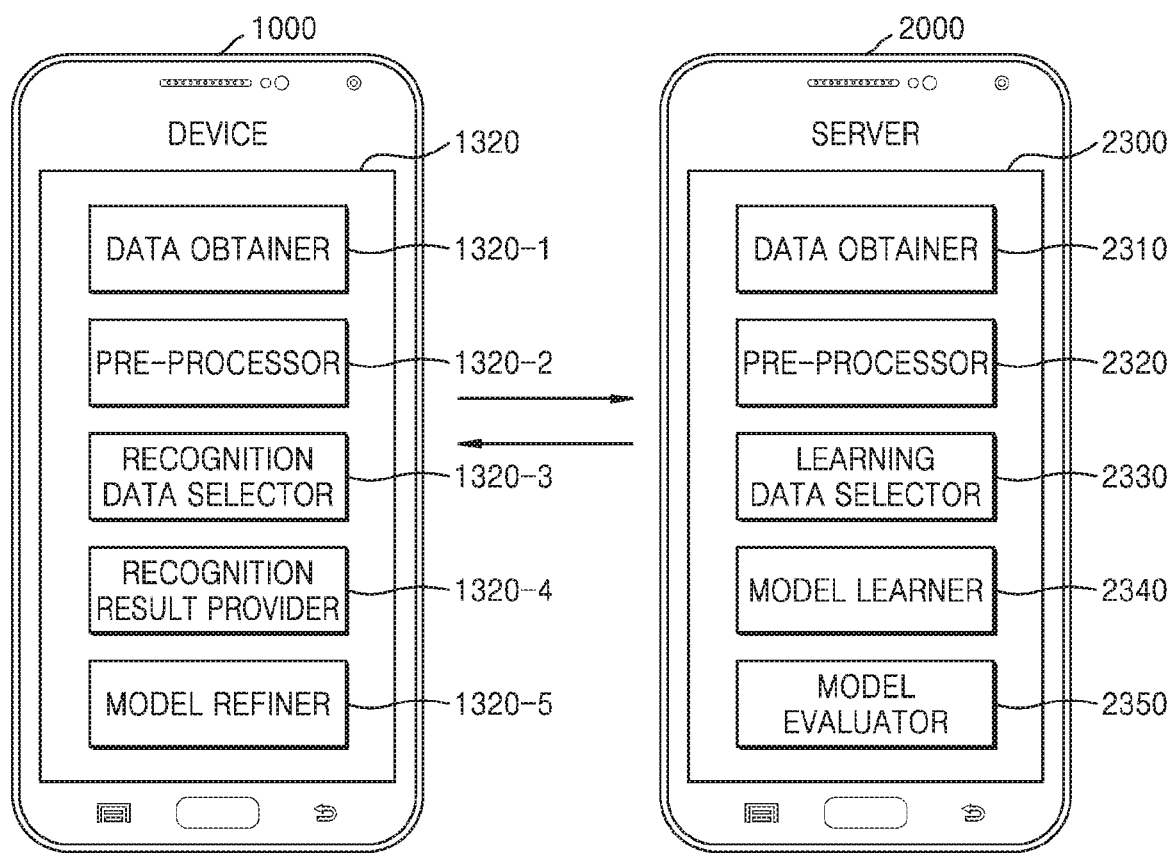
FIG. 23 is a block diagram illustrating an example in which the device and the server interoperate to learn and recognize data, according to one or more embodiments.

FIG. 23 is a block diagram illustrating an example in which the device 1000 and the server 2000 interoperate to learn and recognize data, according to one or more embodiments.

Referring to FIG. 23, the server 2000 may include any one or any combination of a data obtainer 2310, a pre-processor 2320, a learning data selector 2330, a model learner 2340, and a model evaluator 2350. The server 2000 may learn a standard for classifying a device usage inquiry and providing a response operation corresponding to a classification result, and the device 1000 may classify the device usage inquiry based on a learning result of the server 2000 and may determine that the response operation corresponding to the classification result is provided.

In this case, a model learner 2340 of the server 2000 may perform a function of the data learner 1310 of FIG. 21. The model learner 2340 of the server 2000 may learn a standard about which data is to be used in order to classify a device usage inquiry and provide a response operation corresponding to a classification result. Also, the model learner 2340 of the server 2000 may learn a standard about how to classify a device usage inquiry by using data and how to provide a response operation corresponding to a classification result. The model learner 2340 may obtain data to be used for learning, and may learn a standard for classifying a device usage inquiry and providing a response operation corresponding to a classification result by applying the obtained data to a data recognition model that will be described below.

Also, the recognition result provider 1320-4 of the device 1000 may classify a device usage inquiry by applying data selected by the recognition data selector 1320-3 to a data recognition model generated by the server 2000, and may provide a response operation corresponding to a classification result. For example, the recognition result provider 1320-4 may transmit data selected by the recognition data selector 1320-3 to the server 2000, and the server 2000 may request to classify a device usage inquiry and provide a response operation corresponding to a classification result by applying the data selected by the recognition data selector 1320-3 to a recognition model. Also, the recognition result provider 1320-4 may receive information about a method of classifying a device usage inquiry and providing a response operation corresponding to a classification result by the server 2000 from the server 2000.

Alternatively, the recognition result provider 1320-4 of the device 1000 may receive a recognition model generated by the server 2000 from the server 2000, and may classify a device usage inquiry and may provide a response operation corresponding to a classification result by using the received recognition model. In this case, the recognition result provider 1320-4 of the device 1000 may classify a device usage inquiry and may provide a response operation corresponding to a classification result by applying data selected by the recognition data selector 1320-3 to a data recognition model received from the server 2000.

Also, the device 1000 and the server 2000 may effectively perform works for learning and data recognition of a data recognition model through division of roles. Accordingly, data processing may be efficiently performed to provide a service that meets a user's intention and the user's privacy may be effectively protected.

One or more embodiments may be implemented as a recording medium including a computer-readable instruction such as a computer-executable program module. The computer-readable medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium generally includes a computer-readable instruction, a data structure, a program module, other data of a modulated data signal, or another transmission mechanism, and an example thereof includes an arbitrary information transmission medium.

Also, the term "unit" used herein may be a hardware component such as a processor a circuit and/or a software component executed in a hardware component such as a processor.

While the present disclosure has been particularly shown and described with reference to embodiments thereof, it will be understood by one of ordinary skill in the art that various changes in form and details may be made therein without departing from the spirit and scope of the present disclosure as defined by the following claims. Hence, it will be understood that the embodiments described above are not limiting of the scope of the present disclosure. For example, each component described in a single type may be executed in a distributed manner, and components described distributed may also be executed in an integrated form.

The scope of the present disclosure is indicated by the claims rather than by the detailed description of the present disclosure, and it should be understood that the claims and all modifications or modified forms drawn from the concept of the claims are included in the scope of the present disclosure.

What is claimed is:

1. A device comprising:
a memory configured to store at least one program;
a user input interface configured to receive a first user input of a device usage inquiry; and
at least one processor configured to provide a response operation corresponding to the device usage inquiry by executing the at least one program,
wherein the at least one program comprises instructions for:
inputting the first user input of the device usage inquiry to a trained model that is pre-generated;
extracting operation scenario information corresponding to the first user input, based on a result of classifying the device usage inquiry;
determining a recommendation operation for troubleshooting of the device from the operation scenario information,
receiving a second user input for executing the recommendation operation;
identifying trouble of the device solved by the second user input;
determining an additional recommendation operation for the troubleshooting of the device, based on a result of the identified trouble; and
outputting a second suggestion message for suggesting the additional recommendation operation.

2. The device of claim 1, wherein the at least one program further comprises instructions for outputting a first suggestion message,
wherein the outputting of the first suggestion message comprises outputting a first operation guide of the device corresponding to the recommendation operation,
wherein the receiving of the second user input comprises:
receiving the second user input corresponding to the first operation guide; and
performing the recommendation operation with respect to the received the second user input.

3. The device of claim 1, wherein the outputting of the second suggestion message comprises:
outputting a second operation guide of the device corresponding to the additional recommendation operation;
receiving a third user input corresponding to the second operation guide; and
performing the additional recommendation operation with respect to the received the third user input.

4. The device of claim 1, wherein the identifying of the trouble of the device is solved comprises:
outputting a confirmation message for checking the trouble of the device has been solved by the second user input;
receiving a fourth user input corresponding to the confirmation message; and
identifying the trouble of the device is solved based on the fourth user input.

5. The device of claim 1, wherein the determining of the additional recommendation operation comprises:
re-classifying the device usage inquiry based on a result of the identified trouble;
re-extracting the operation scenario information based on a result of the re-classifying the device usage inquiry; and
determining the additional recommendation operation from the re-extracted operation scenario information.

6. The device of claim 1, wherein the extracted operation scenario information comprises an execution order of detailed response operations corresponding to the device usage inquiry, and
wherein the recommendation operation is determined from the detailed response operations based on the execution order.

7. The device of claim 1, wherein the extracting of operation scenario information comprises:
extracting specification information of the device and state information of the device; and
extracting the operation scenario information based on the extracted specification information of the device and the extracted state information of the device.

8. A method of controlling a device for providing a response operation corresponding to a device usage inquiry, the method comprising:
receiving a first user input of the device usage inquiry;
inputting the first user input of the device usage inquiry to a trained model that is pre-generated;

extracting operation scenario information corresponding to the first user input, based on a result of classifying the device usage inquiry;

determining a recommendation operation for troubleshooting of the device from the operation scenario information;

identifying trouble of the device solved by a second user input;

determining an additional recommendation operation for the troubleshooting of the device, based on a result of the identified trouble; and outputting a second suggestion message for suggesting the additional recommendation operation.

9. The method of claim 8, further comprising outputting a first suggestion message, wherein the outputting of the first suggestion message comprises outputting a first operation guide of the device corresponding to the recommendation operation, wherein the receiving of the second user input comprises:

receiving the second user input corresponding to the first operation guide; and performing the recommendation operation with respect to the received the second user input.

10. The method of claim 8, wherein the outputting of the second suggestion message comprises:

outputting a second operation guide of the device corresponding to the additional recommendation operation;

receiving a third user input corresponding to the second operation guide; and performing the additional recommendation operation with respect to the received the third user input.

11. The method of claim 8, wherein the identifying of the trouble of the device is solved comprises:

outputting a confirmation message for checking the trouble of the device has been solved by the second user input;

receiving a fourth user input corresponding to the confirmation message; and identifying the trouble of the device is solved based on the fourth user input.

12. The method of claim 8, wherein the determining of the additional recommendation operation comprises:

re-classifying the device usage inquiry based on a result of the identified trouble;

re-extracting the operation scenario information based on a result of the re-classifying the device usage inquiry; and determining the additional recommendation operation from the re-extracted operation scenario information.

13. The method of claim 8, wherein the extracted operation scenario information comprises an execution order of detailed response operations corresponding to the device usage inquiry, and wherein the recommendation operation is determined from the detailed response operations based on the execution order.

14. The method of claim 8, wherein the extracting of operation scenario information comprises:

extracting specification information of the device and state information of the device; and extracting the operation scenario information based on the extracted specification information of the device and the extracted state information of the device.

15. A non-transitory computer-readable recording medium having recorded thereon a program for implementing a method of controlling a device for providing a response operation corresponding to a device usage inquiry, the method including:

receiving a first user input of the device usage inquiry;

inputting the first user input of the device usage inquiry to a trained model that is pre-generated;

extracting operation scenario information corresponding to the first user input, based on a result of classifying the device usage inquiry;

determining a recommendation operation for troubleshooting of the device from the operation scenario information;

outputting a first suggestion message for suggesting the recommendation operation;

receiving a second user input for executing the recommendation operation;

identifying trouble of the device is solved by the second user input;

determining an additional recommendation operation for the trouble shooting of the device, based on a result of the identified trouble; and outputting a second suggestion message for suggesting the additional recommendation operation.

* * * * *